United States Patent
Miyazaki et al.

(10) Patent No.: US 8,199,243 B2
(45) Date of Patent: Jun. 12, 2012

(54) IMAGING DEVICE AND CAMERA BODY

(75) Inventors: Kyoichi Miyazaki, Osaka (JP); Kenichi Honjo, Osaka (JP); Yuichi Kimura, Osaka (JP); Shogo Sasaki, Osaka (JP); Masato Murayama, Osaka (JP)

(73) Assignee: Panasonic Corporation, Osaka (JP)

( * ) Notice: Subject to any disclaimer, the term of this patent is extended or adjusted under 35 U.S.C. 154(b) by 551 days.

(21) Appl. No.: 12/429,453

(22) Filed: Apr. 24, 2009

(65) Prior Publication Data

US 2009/0268078 A1 Oct. 29, 2009

(30) Foreign Application Priority Data

Apr. 28, 2008 (JP) .................................. 2008-116744

(51) Int. Cl.
*G02B 13/16* (2006.01)
(52) U.S. Cl. ..................... 348/335; 348/207.99; 396/439
(58) Field of Classification Search .................. 348/335, 348/208.4, 208.16, 208.99; 396/52, 55
See application file for complete search history.

(56) References Cited

U.S. PATENT DOCUMENTS

| | | | |
|---|---|---|---|
| 5,818,527 A * | 10/1998 | Yamaguchi et al. | 348/335 |
| 6,122,449 A * | 9/2000 | Satoh et al. | 396/55 |
| 6,208,377 B1 * | 3/2001 | Morofuji et al. | 348/208.8 |
| 6,233,009 B1 * | 5/2001 | Morofuji et al. | 348/208.8 |
| 6,429,895 B1 * | 8/2002 | Onuki | 348/208.99 |
| 2002/0097324 A1 * | 7/2002 | Onuki | 348/208 |
| 2006/0055787 A1 * | 3/2006 | Hirota et al. | 348/208.5 |
| 2008/0175514 A1 * | 7/2008 | Nose et al. | 382/275 |
| 2008/0180535 A1 * | 7/2008 | Habuka et al. | 348/208.4 |
| 2009/0002526 A1 * | 1/2009 | Koishi | 348/241 |
| 2009/0059041 A1 * | 3/2009 | Kwon | 348/241 |
| 2009/0167925 A1 * | 7/2009 | Murata | 348/345 |

FOREIGN PATENT DOCUMENTS

| | | |
|---|---|---|
| JP | 11-088732 A | 3/1999 |
| JP | 11-313250 A | 11/1999 |
| JP | 2000-125175 A | 4/2000 |
| JP | 2007-129587 A | 4/2009 |

\* cited by examiner

*Primary Examiner* — Clayton E Laballe
*Assistant Examiner* — Warren Fenwick
(74) *Attorney, Agent, or Firm* — Panasonic Patent Center; Dhiren Odedra; Kerry Culpepper

(57) ABSTRACT

A digital camera comprises an interchangeable lens unit and a camera body. The interchangeable lens unit is provided to form an optical image of a subject. A flash memory is configured to hold a correction coefficient table used to electrically correct distortion produced by the optical system. The camera body has a CCD image sensor, a correction coefficient acquisition part, an operation part, and a correction processor. The correction coefficient acquisition part is configured to acquire the correction coefficient table held in the flash memory. The operation part is configured to produce correction data by performing an interpolation operation or an extrapolation operation on the information obtained from the correction coefficient table. The correction processor is configured to correct distortion in the image data on the basis of information produced by the operation part.

20 Claims, 20 Drawing Sheets

| FENC \ ZENC | 0 | 1 | 2 | 3 | ... | Nz |
|---|---|---|---|---|---|---|
| 0 | C3(0,0) C5(0,0) C7(0,0) T(0,0) | C3(1,0) C5(1,0) C7(1,0) T(1,0) | C3(2,0) C5(2,0) C7(2,0) T(2,0) | C3(3,0) C5(3,0) C7(3,0) T(3,0) | ... | C3(Nz,0) C5(Nz,0) C7(Nz,0) T(Nz,0) |
| 1 | C3(0,1) C5(0,1) C7(0,1) T(0,1) | C3(1,1) C5(1,1) C7(1,1) T(1,1) | C3(2,1) C5(2,1) C7(2,1) T(2,1) | C3(3,1) C5(3,1) C7(3,1) T(3,1) | ... | C3(Nz,1) C5(Nz,1) C7(Nz,1) T(Nz,1) |
| 2 | C3(0,2) C5(0,2) C7(0,2) T(0,2) | C3(1,2) C5(1,2) C7(1,2) T(1,2) | C3(2,2) C5(2,2) C7(2,2) T(2,2) | C3(3,2) C5(3,2) C7(3,2) T(3,2) | ... | C3(Nz,2) C5(Nz,2) C7(Nz,2) T(Nz,2) |
| 3 | C3(0,3) C5(0,3) C7(0,3) T(0,3) | C3(1,3) C5(1,3) C7(1,3) T(1,3) | C3(2,3) C5(2,3) C7(2,3) T(2,3) | C3(3,3) C5(3,3) C7(3,3) T(3,3) | ... | C3(Nz,3) C5(Nz,3) C7(Nz,3) T(Nz,3) |
| ⋮ | ⋮ | ⋮ | ⋮ | ⋮ | | ⋮ |
| Nf | C3(0,Nf) C5(0,Nf) C7(0,Nf) T(0,Nf) | C3(1,Nf) C5(1,Nf) C7(1,Nf) T(1,Nf) | C3(2,Nf) C5(2,Nf) C7(2,Nf) T(2,Nf) | C3(3,Nf) C5(3,Nf) C7(3,Nf) T(3,Nf) | ... | C3(Nz,Nf) C5(Nz,Nf) C7(Nz,Nf) T(Nz,Nf) |

Fig. 11

IMAGING DEVICE AND CAMERA BODY

CROSS-REFERENCE TO RELATED APPLICATIONS

This application claims priority to Japanese Patent Application No. 2008-116744 filed on Apr. 28, 2008. The entire disclosure of Japanese Patent Application No. 2008-116744 is hereby incorporated herein by reference.

BACKGROUND

1. Technical Field

The technical field relates to an imaging device and a camera body, and more particularly to an imaging device with an interchangeable lens, and a camera body to which an interchangeable lens unit is mounted.

2. Description of the Related Art

A digital camera is a known example of an imaging device that acquires image data of a subject. A digital camera has an optical system for forming an optical image of the subject, and an imaging element configured to convert the optical image into image data. This allows image data of the subject to be acquired.

However, the optical image formed by the optical system is sometimes distorted by distortion. Accordingly, the subject may be distorted in the image when the acquired image data is displayed as an image, and this is undesirable.

In view of this, a digital camera has been proposed in which the acquired image data is subjected to correction processing of the distortion, as disclosed in Japanese Laid-Open Patent Application 2007-129587.

A digital camera is a digital single lens reflex camera with an interchangeable lens. With an interchangeable lens system, the specifications of the optical system will vary from lens to lens, so the characteristics of distortion also vary with the interchangeable lens that is mounted. If the distortion characteristics are different, the as correction processing must also be changed according to the distortion characteristics.

In view of this, an imaging device has been proposed in which information for correcting distortion is acquired on the interchangeable lens side.

However, the amount of information used for correcting distortion is far larger than the amount of other information transmitted from the interchangeable lens to the camera body, so data transmission can be expected to take a long time. If transmission takes more time, then the start-up of the imaging device will also take longer, which is extremely inconvenient to the user.

It is possible to reduce the amount of correction information, but this is undesirable because it reduces the accuracy of distortion correction.

SUMMARY

It is an object to provide an imaging device with which good distortion correction accuracy is ensured, and convenience is enhanced.

The imaging device according to a first aspect is an imaging device for acquiring image data for a subject, comprising an interchangeable lens unit and a camera body. The interchangeable lens unit is provided to form an optical image of the subject. A first holding part holds first correction information used to electrically correct distortion produced by the optical system. The camera body has an image acquisition part, a correction information acquisition part, an operation part, and a distortion corrector. The image acquisition part is configured to convert the optical image into image data. The correction information acquisition part is configured to acquire the first correction information held in the first holding part. The operation part is configured to produce second correction information by performing an interpolation operation or an extrapolation operation on the first correction information. The distortion corrector is configured to correct distortion in the image data on the basis of the second correction information.

With this imaging device, the first correction information held in the first holding part of the interchangeable lens unit is brought into the camera body by the correction information acquisition part. An interpolation operation or an extrapolation operation is performed on this first correction information, and second correction information is produced by the operation part. Since the correction of distortion is performed on the basis of this second correction information, even if there is only a small amount of first correction information, enough information to ensure accurate distortion correction by the interpolation operation or the extrapolation operation can be acquired as second correction information. Consequently, with this imaging device, distortion correction accuracy can be ensured while also enhancing convenience.

The "imaging device" here encompasses devices that only perform still picture capture, devices that only perform moving picture capture, and devices that perform still picture capture and moving picture capture. The first correction information can be any of various kinds of information used for correcting distortion.

The imaging device according to a second aspect is the imaging device of the first aspect, wherein the first correction information includes a plurality of correction coefficients used to correct the distortion in the image data, and the camera body has a correction information selector configured to select the correction coefficients from the first correction information as selected correction coefficient group. The operation part is configured to produce the second correction information on the basis of the selected correction coefficient group.

The imaging device according to a third aspect is the imaging device of the second aspect, wherein the optical system is capable of changing the focal distance, and has a focus lens arranged to adjust the focal state of the optical image. The first correction information includes a correction coefficient table, in which are arranged the plurality of correction coefficients used to correct the distortion on the basis of zoom information related to the focal distance of the optical system and focus information related to the focal state of the optical image.

The imaging device according to a fourth aspect is the imaging device of the second aspect, wherein the interchangeable lens unit has a first detector configured to acquire the zoom information as a detected zoom information, and a second detector configured to acquire the focus information as a detected focus information. The camera body has a first information acquisition part configured to acquire the detected zoom information from the first detector, and a second information acquisition part configured to acquire the detected focus information from the first detector. The correction information selector is configured to select the correction coefficients corresponding to the detected zoom information and the detected focus information from the second correction information.

The imaging device according to a fifth aspect is the imaging device of the fourth aspect, wherein the correction coefficient table includes a plurality of correction ratios arranged along with the plurality of correction coefficients on the basis of the zoom information and the focus information and used to adjust the proportion in which the correction coefficients act during correction of the distortion.

The imaging device according to a sixth aspect is the imaging device of any one of the first to fifth aspects, wherein the distortion corrector is configured to correct distortion by using a magnifying power correction value for keeping the corrected image data at or above a specific size.

The imaging device according to a seventh aspect is the imaging device of any one of the first to sixth aspects, wherein the first holding part is configured to hold first identification information used to identify the interchangeable lens unit. The camera body has an identification information acquisition part capable of acquiring the first identification information held in the first holding part as a second identification information, a second holding part that can associate and hold the identification information and the first correction information corresponding to the second identification information, and a comparator configured to compare the first identification information held in the first holding part with the identification information held in the second holding part. When the comparator determines that the first identification information held in the first holding part matches the second identification information held in the second holding part, the distortion corrector corrects the distortion by using the first correction information held in the second holding part and corresponding to the second identification information.

The imaging device according to an eighth aspect is the imaging device of any one of the first to seventh aspects, further comprising an accessory unit. The accessory unit is mounted between the interchangeable lens unit and the camera body, and has a third holding part configured to hold third correction information used to correct the distortion. The correction information acquisition part is able to acquire the third correction information held in the third holding part. The distortion corrector is configured to correct the distortion on the basis of the first correction information and the third correction information.

The camera body according to a ninth aspect is used in an imaging device for acquiring image data of a subject along with an interchangeable lens unit. The camera body comprises an image acquisition part, a correction information acquisition part, an operation part, and a distortion corrector. The image acquisition part is configured to convert an optical image of the subject into image data. The correction information acquisition part is configured to acquire from the interchangeable lens unit first correction information used to electrically correct distortion produced by the interchangeable lens unit. The operation part is configured to produce second correction information by performing an interpolation operation or an extrapolation operation on the first correction information. The distortion corrector is configured to correct distortion in the image data on the basis of the second correction information.

With this camera body, first correction information is brought from the interchangeable lens unit into the camera body by the correction information acquisition part. This first correction information is subjected to an interpolation operation or an extrapolation operation, and second correction information is produced by the operation part. Since distortion is corrected on the basis of this second correction information, even if there is only a small amount of first correction information, enough information to ensure accurate distortion correction by the interpolation operation or the extrapolation operation can be acquired as second correction information. Consequently, with this camera body, distortion correction accuracy can be ensured while also enhancing convenience.

BRIEF DESCRIPTION OF THE DRAWINGS

Referring now to the attached drawings which form a part of this original disclosure:

FIG. 11 is an example of a correction coefficient table;

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Summary of Digital Camera

Figure 1:
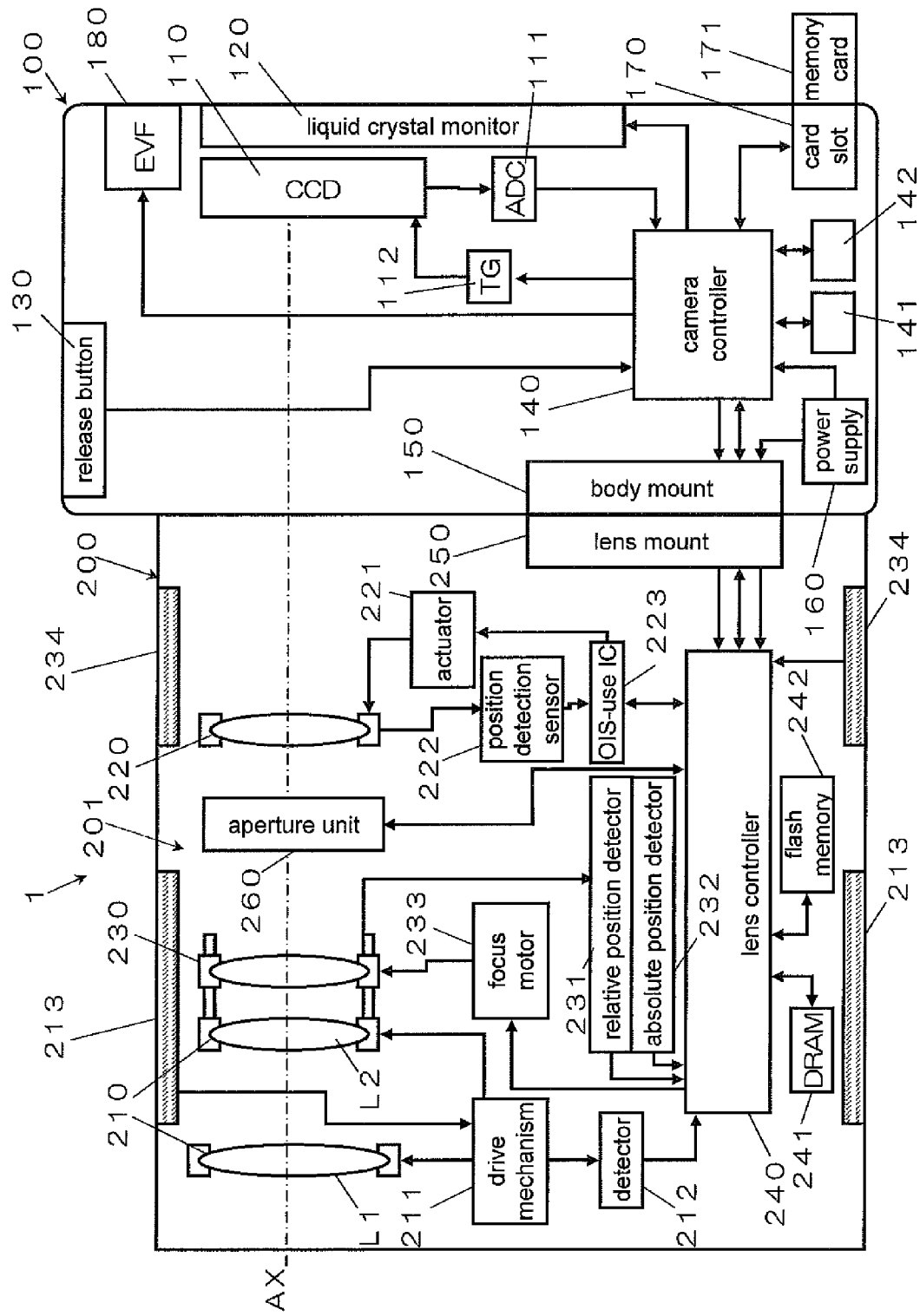
FIG. 1 is a diagram of the overall configuration of a digital camera.

FIG. 1 is a block diagram of the configuration of a digital camera 1 pertaining to a first embodiment. The digital camera 1 (an example of the imaging device) is a digital single lens reflex camera with an interchangeable lens. More specifically, as shown in FIG. 1, the digital camera 1 comprises a camera body 100 and an interchangeable lens unit 200 that can be attached to or removed from the camera body 100. The digital camera 1 is, for example, able to capture still and moving pictures.

The digital camera 1 has a function of electrically correcting distortion produced by the optical system. This distortion correction will be discussed below.

Configuration of Camera Body

As shown in FIG. 1, the camera body 100 mainly comprises a CCD image sensor 110 (an example of the image acquisition part), a liquid crystal monitor 120, an electronic viewfinder 180, a camera controller 140, a body mount 150, a power supply 160, and a card slot 170.

The CCD image sensor 110 converts the optical image formed by the interchangeable lens unit 200 into an electrical signal, and produces image data of the subject. The image data thus produced is digitized by an A/D converter 111. The image data digitized by the A/D converter 111 is subjected to various image processing by the camera controller 140. This "various image processing" can be gamma correction processing, white balance correction processing, scratch correction processing, YC conversion processing, electronic zoom processing, and JPEG compression processing. These will be discussed below.

The CCD image sensor 110 operates at a timing controlled by a timing generator 112. The CCD image sensor 110 captures still and moving pictures. The capture of moving pictures includes the capture of through-images. The term "through-images" here refers to images that are not recorded as data to a memory card 171 after their capture. These through-images are displayed on the liquid crystal monitor 120 and the electronic viewfinder 180 (hereinafter also referred to as "EVF") in order to determine the composition for capturing moving or still pictures. The capture of moving pictures also includes the recording of moving pictures. The recording of moving pictures is an operation that includes the capture of moving pictures and the recording of moving picture data to the memory card 171. The CCD image sensor 110 is an example of an imaging element. The concept of an imaging element encompasses CMOS image sensors and the like.

The liquid crystal monitor 120 displays the image indicated by the display image data that has undergone image processing by the camera controller 140. The liquid crystal monitor 120 can selectively display both moving and still pictures. The liquid crystal monitor 120 is an example of a display unit, but the display unit can also be an organic electroluminescence device, an inorganic electroluminescence device, a plasma display panel, or another such device capable of displaying images.

The electronic viewfinder 180 has an EVF liquid crystal monitor (not shown), and displays images that have undergone image processing by the camera controller 140. The EVF 180 can selectively display both moving and still pictures. The EVF 180 and the liquid crystal monitor 120 may display the same or different content. The display operation of the EVF 180 and the liquid crystal monitor 120 is controlled by the camera controller 140.

The card slot 170 allows the memory card 171 to be inserted. The card slot 170 stores image data on the memory card 171, or reads image data from the memory card 171, on the basis of control by the camera controller 140. The memory card 171 can hold image data produced by the image processing of the camera controller 140.

The power supply 160 supplies power that is used by the digital camera 1. The power supply 160 may, for example, be a dry cell or a rechargeable battery. It is also possible to supply power to the digital camera 1 from the outside with a power cord or the like.

The body mount 150 can be electrically and mechanically connected to a lens mount 250 of the interchangeable lens unit 200. Data can be sent back and forth between the camera body 100 and the interchangeable lens unit 200 via the body mount 150 and the lens mount 250.

The camera controller 140 controls the various parts of the digital camera 1. For example, the camera controller 140 sends a vertical synchronization signal to the timing generator 112. In parallel with this, the camera controller 140 produces an exposure synchronization signal on the basis of the vertical synchronization signal. The camera controller 140 repeatedly and periodically sends the exposure synchronization signal thus produced to a lens controller 240 via the body mount 150 and the lens mount 250.

Figure 2:
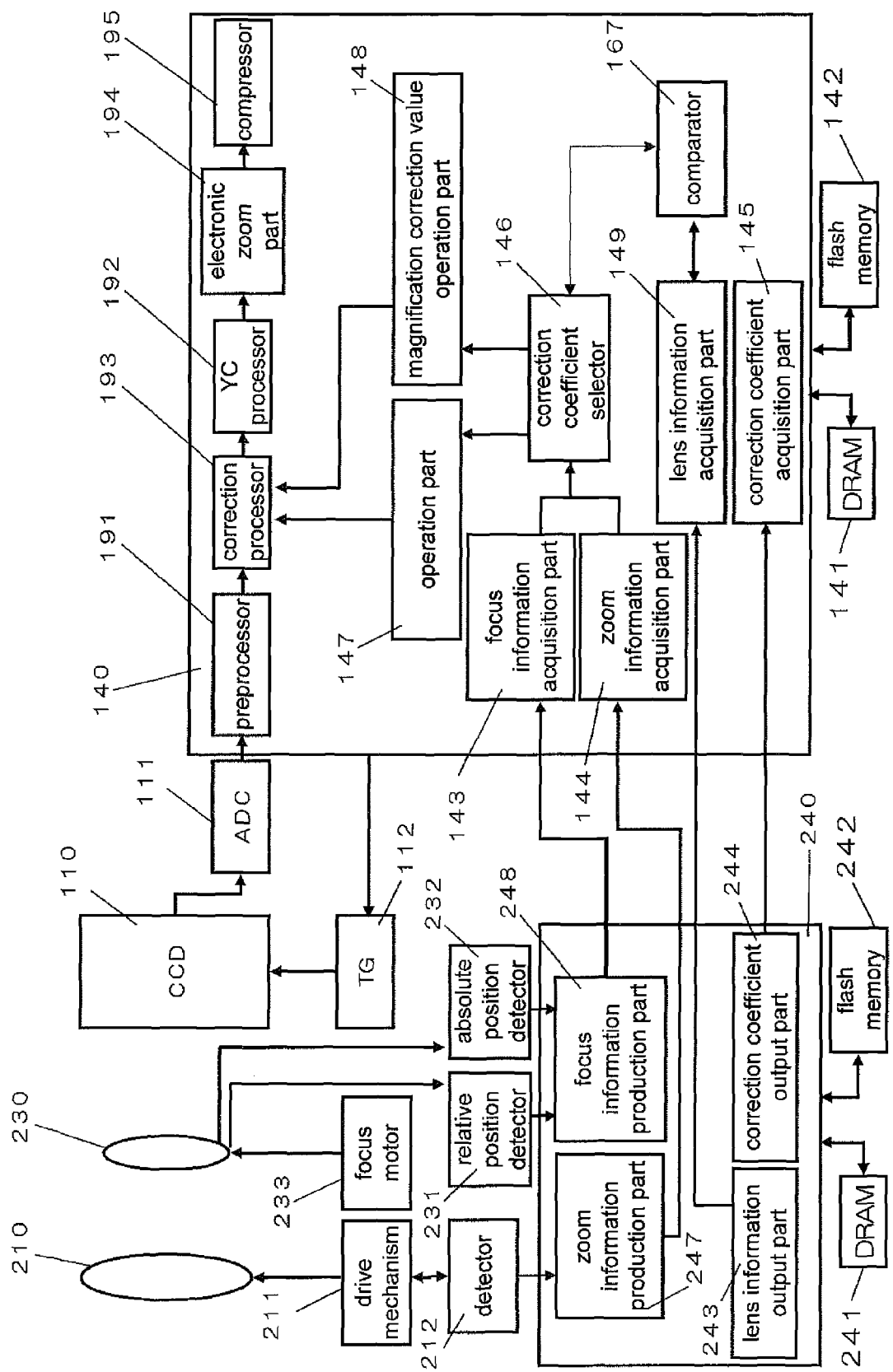
FIG. 2 is a diagram of the detailed configuration of a digital camera.

As shown in FIG. 2, the camera controller 140 has a preprocessor 191, a correction processor 193, a YC processor 192, an electronic zoom unit 194, and a compressor 195.

The preprocessor 191 subjects the image data outputted from the CCD image sensor 110 to gamma correction processing, white balance correction processing, and scratch correction processing, for example. The preprocessor 191 is able to adjust the number of pixels in the horizontal and vertical directions of the image data under control by the camera controller 140.

The YC processor 192 converts the image data processed by the preprocessor 191 into YC data including a brightness signal and a color different signal. In this embodiment, image data outputted from the YC processor 192 is used as reference image data.

The electronic zoom unit 194 performs electronic zoom processing. This electronic zoom processing includes processing for cropping image data of the area to be enlarged from out of the input image data, and processing for increasing the number of pixels by interpolation operation of the cropped image data. The electronic zoom unit 194 is also able to perform just interpolation operation, without performing the cropping.

The compressor 195 converts the YC data into compressed data conforming to the JPEG standard or the like. The compressed image data is recorded to the memory card 171 via the card slot 170.

A DRAM 141 functions as a working memory during the control operation of the camera controller 140 or during imaging with the camera controller 140.

Configuration of Interchangeable Lens Unit

As shown in FIG. 1, the interchangeable lens unit 200 mainly comprises an optical system 201, the lens controller 240, the lens mount 250, and an aperture unit 260.

The optical system 201 is a zoom lens system with a variable focal point, and includes the lens controller 240, a zoom lens 210, a zoom ring 213, an OIS (optical image stabilizer) lens 220, and a focus lens 230.

The zoom lens 210 is a lens for varying the magnification of the optical image of the subject (hereinafter also referred to as the subject image) formed by the optical system 201, that is, the focal distance of the optical system 201. The zoom lens 210 comprises one or more lenses. For instance, the zoom lens 210 may include a first lens group L1 and a second lens group L2. The focal distance of the optical system 201 changes when the zoom lens 210 moves in a direction along the optical axis AX of the optical system 201.

The zoom ring 213 is a member for manually adjusting the focal distance. A drive mechanism 211 converts the rotational movement of the zoom ring 213 into linear movement of the zoom lens 210. The zoom lens 210 can be moved in the optical axis AX direction by turning the zoom ring 213.

A detector 212 detects the amount of drive of the zoom lens 210 in the drive mechanism 211. More specifically, the lens controller 240 has a zoom information production part 247 (an example of the first detector). The zoom information production part 247 calculates zoom information ZENC1 (an example of detected zoom information) of the optical system 201 on the basis of the detection result of the detector 212. The zoom information is, for example, the position of the zoom lens 210, or the focal distance of the optical system 201. The zoom information ZENC1 is sent at specific intervals from the zoom information production part 247 to the camera controller 140. This allows the lens controller 240 and the camera controller 140 to ascertain the state of the optical system 201 (such as the focal distance).

Also, the lens controller 240 can ascertain the position of the zoom lens (L1, L2, etc.) in the optical axis AX direction within the interchangeable lens unit 200 from the operation result of the zoom information production part 247.

The OIS lens 220 is a lens for correcting blur of the subject image produced by the optical system 201 of the interchangeable lens unit 200. More specifically, the OIS lens 220 corrects blur of the subject image produced by shake of the digital camera 1. The OIS lens 220 moves in the direction of canceling out shake of the digital camera 1, and thereby reduces relative blur between the subject image and the CCD image sensor 110. More specifically, the OIS lens 220 moves in the direction of canceling out shake of the digital camera 1, and thereby reduces blur of the subject image at the CCD image sensor 110. The OIS lens 220 is constituted by one or more lenses. An actuator 221 receives control from an OIS-use IC 223 and drives the OIS lens 220 in a plane perpendicular to the optical axis AX of the optical system 201.

The actuator 221 can consist of a magnet and a flat coil, for example. A position detection sensor 222 detects the position of the OIS lens 220 in a plane perpendicular to the optical axis AX of the optical system 201. The position detection sensor 222 can consist of a magnet and a hole element, for example. The OIS-use IC 223 controls the actuator 221 on the basis of the detection result of a shake detector, such as a gyro sensor, and the detection result of the position detection sensor 222. The OIS-use IC 223 obtains the detection result of the shake detector from the lens controller 240. The OIS-use IC 223 also sends the lens controller 240 a signal indicating the state of optical image blur correction processing.

The focus lens 230 is for changing the focal state of the subject image formed on the CCD image sensor 110 by the optical system 201. The focus lens 230 has one or more lenses. The focal state of the subject image can be changed by moving the focus lens 230 in a direction parallel to the optical axis AX.

The focus lens 230 is driven separately from the zoom lens 210. More specifically, a focus motor 233 drives the focus lens 230 in the optical axis AX direction with respect to the second lens group L2. In other words, the focus motor 233 can vary the relative distance between the second lens group L2 and the focus lens 230 in the optical axis AX direction. The focus lens 230 and the focus motor 233 move along with the second lens group L2 in the optical axis AX direction. Therefore, when the second lens group L2 moves in the optical axis AX direction when the magnification of the optical system 201 is varied, the focus lens 230 and the focus motor 233 also move in the optical axis AX direction. Even in a state in which the second lens group L2 is stationary in the optical axis AX direction, the focus motor 233 can drive the focus lens 230 in the optical axis AX direction with respect to the second lens group L2.

A relative position detector 231 is a unit for detecting the relative position of the focus lens 230, and can consist of a magnetic scale and a magnetic sensor. The magnetic scale is fixed to a frame supporting the focus lens, for example, and has been magnetized to two poles equidistant in a direction parallel to the optical axis AZ. The magnetic sensor is an MR sensor, for example. When the magnetic scale and magnetic sensor move relatively in a direction parallel to the optical axis AZ, the magnetic sensor detects a change in magnetism and outputs a signal corresponding to this change.

An absolute position detector 232 is a unit for detecting whether or not the focus lens 230 is in a reference position. The absolute position detector 232 is a photosensor, for example.

The lens controller 240 drives the focus lens 230 to a starting point position, and uses a signal from the absolute position detector 232 to confirm that the focus lens 230 is at the starting point. More specifically, the lens controller 240 has a focus information production part 248 (an example of the second detector). The focus information production part 248 uses a signal from the absolute position detector 232 to confirm that the focus lens 230 is at the starting point. At this time the focus information production part 248 resets the focus information to FENC1=0. The focus information FENC1 is an example of detected focus information.

The focus information production part 248 counts the extreme values of magnetic change from a signal outputted by the relative position detector 231. The focus information production part 248 detects the extreme values of magnetic change on the basis of a signal outputted from a magnetic sensor. If an extreme value of magnetic change is detected when the focus lens 230 moves to the subject side, the focus information production part 248 subjects the focus information to an operation of FENC1=FENC1+1.

If an extreme value of magnetic change is detected when the focus lens 230 moves to the CCD image sensor 110 side, the focus information production part 248 subjects the focus information to an operation of FENC1=FENC1−1. Thus, the position of the focus lens 230 in the optical axis AX direction (focus information FENC1) with respect to the second lens group L2 can be ascertained by detecting the relative position of the focus lens 230 from the starting point position, which is an absolute position. The focus information FENC1 is sent from the focus information production part 248 to the camera controller 140 at specific intervals.

The aperture unit 260 is a light quantity adjusting unit that adjusts the amount of light that passes through the optical system 201. The aperture unit 260 has aperture blades that can block out part of the light passing through the optical system 201, and an aperture driver (not shown) that drives the aperture blades. The aperture unit 260 is controlled by the camera controller 140.

The lens controller 240 controls the various parts of the interchangeable lens unit 200 on the basis of control signals from the camera controller 140. The lens controller 240 receives signals from the detector 212, the OIS-use IC 223, the relative position detector 231, and the absolute position detector 232, and sends these to the camera controller 140. The lens controller 240 uses a DRAM 241 as a working memory. A flash memory 242 stores programs and parameters used to control the digital camera 1. For example, the correction coefficient table used for distortion correction is held in the flash memory 242.

Basic Concept of Distortion Correction

As discussed above, the digital camera 1 has a function of electrically correcting distortion. The basic concept behind distortion correction will be described here.

Figure 3:
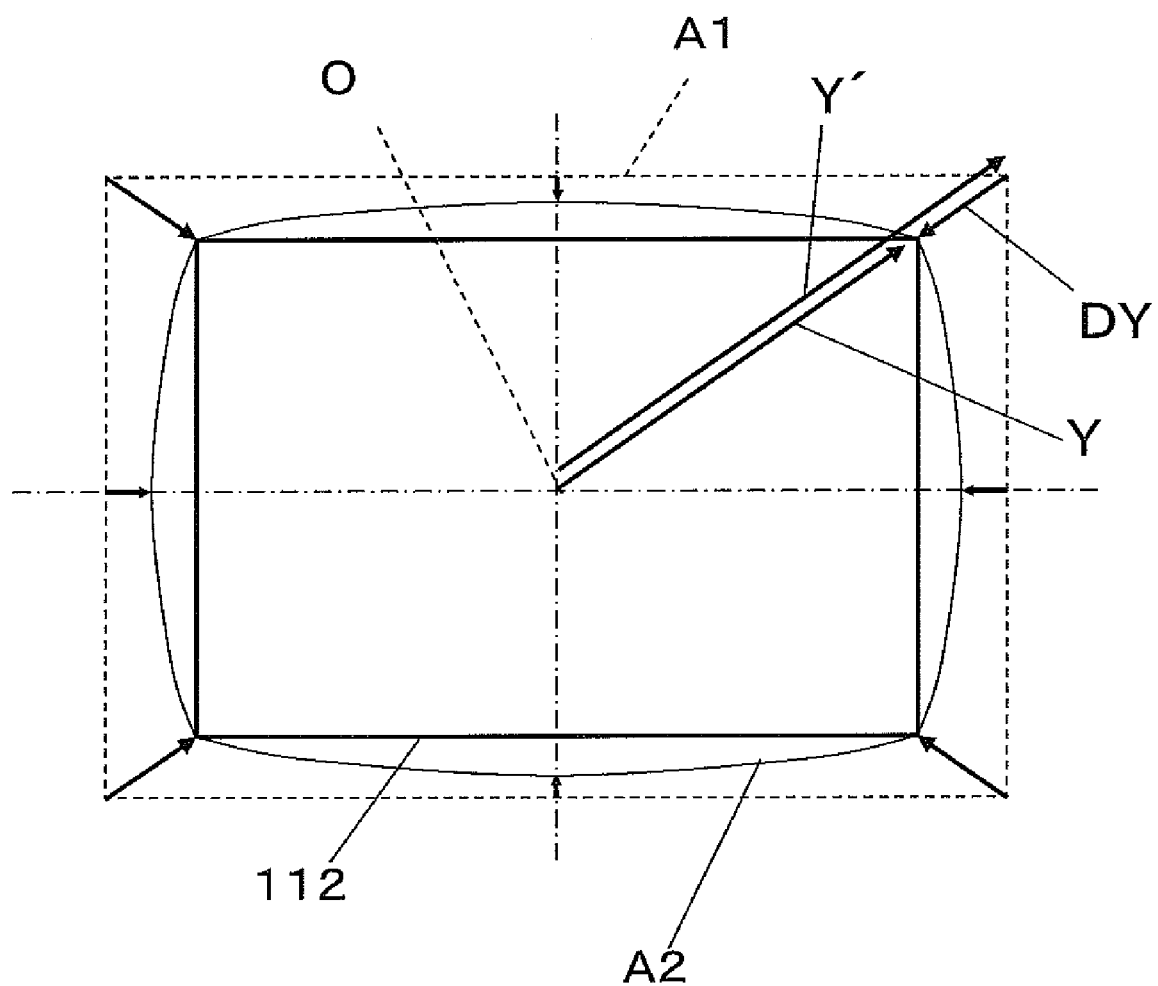
FIG. 3 is diagram of distortion (barrel shape)
Figure 4:
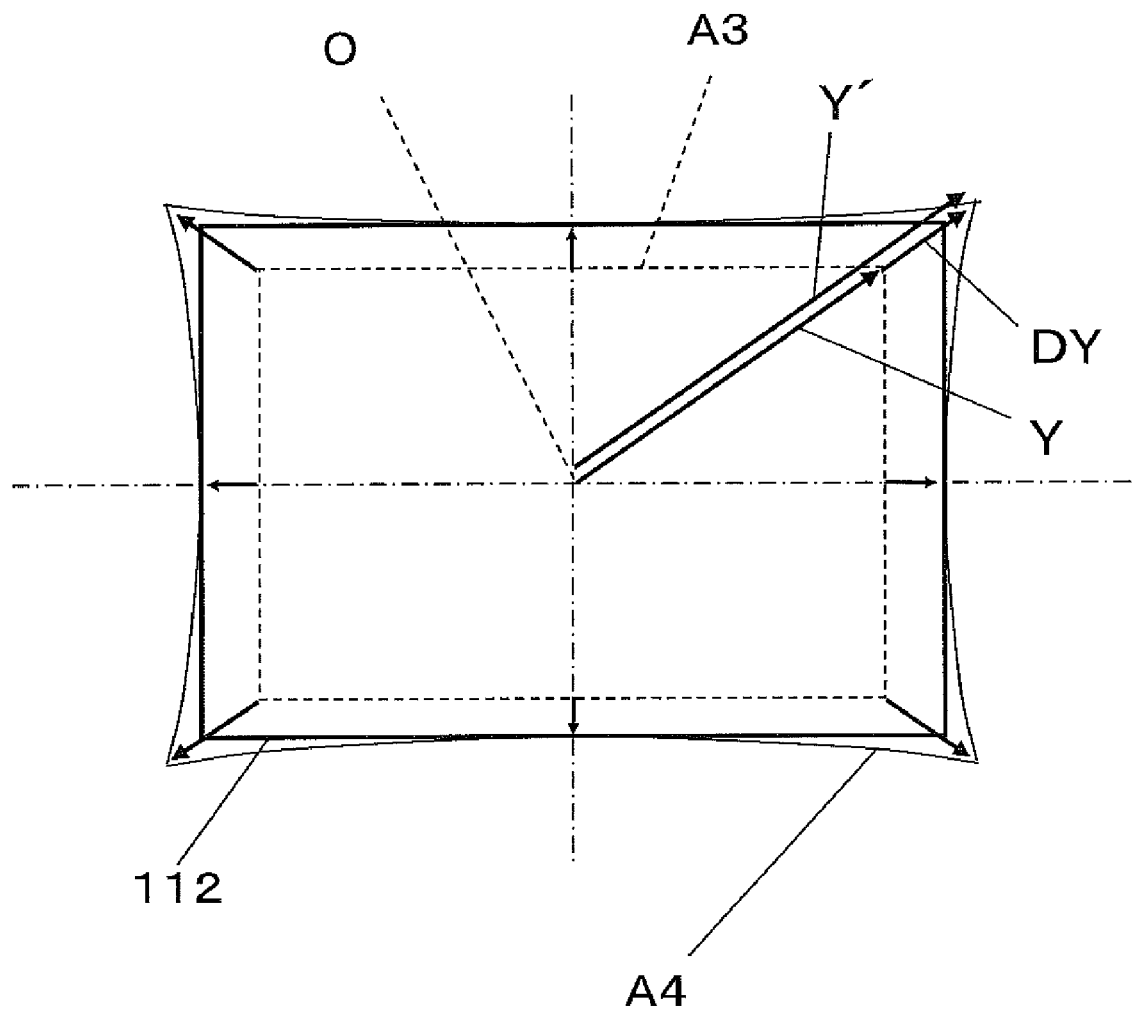
FIG. 4 is diagram of distortion (spool shape)

As shown in FIGS. 3 and 4, there are two types of distortion: barrel shaped and spool shaped. With barrel-shaped distortion, if we use as a reference an image AT that is free of distortion, the four corners of the image AT are distorted inward toward the optical center O, and an image A2 that has an overall rounded shape is formed on the CCD image sensor 110. The optical center O is the center of the CCD image sensor 110, and substantially coincides with the optical axis AX of the optical system 201.

Meanwhile, with spool-shaped distortion, if we use as a reference an image A3 that is free of distortion, the four corners of the image A3 are distorted so that they spread outward toward the optical center O, and an image A4 that has a pointed shape at the corners is formed on the CCD image sensor 110.

Thus, when distortion occurs, the subject image is distorted around the outer peripheral part of the image acquired by the CCD image sensor 110.

If we let DY be the amount of distortion, Y be the actual image height where distortion has occurred (the distance from the optical center O in the images A2 and A4), and Y' be the ideal image height where distortion has not occurred (the distance from the optical center O in the images A1 and A3), then the amount of distortion DY is expressed by the following Equation 1.

$$DY = Y - Y' \tag{1}$$

In this embodiment, the amount of distortion DY is defined by the following Equation 2.

$$DY = C3 \times Y^3 + C5 \times Y^5 + C7 \times Y^7 \tag{2}$$

The correction coefficients C3, C5, and C7 have different optimal values according to the specifications of the optical system in which the interchangeable lens unit is installed. That is, these correction coefficients C3, C5, and C7 can be considered characteristic values of the interchangeable lens unit 200. The correction of distortion is performed by using these coefficients. Equation 2 here is an example of the formula used to correct distortion, but another formula may be used instead. If another formula is used, the type of correction coefficient may be different from that in Equation 2.

To correct distortion, the actual image height Y must be converted into the ideal image height Y'. To convert the actual image height Y into the ideal image height Y', the gain G must be defined by the following Equation 3.

$$G = \frac{Y'}{Y} = 1 - \frac{DY}{Y} = 1 - C3 \times Y^2 - C5 \times Y^4 - C7 \times Y^6 \tag{3}$$

Figure 5:
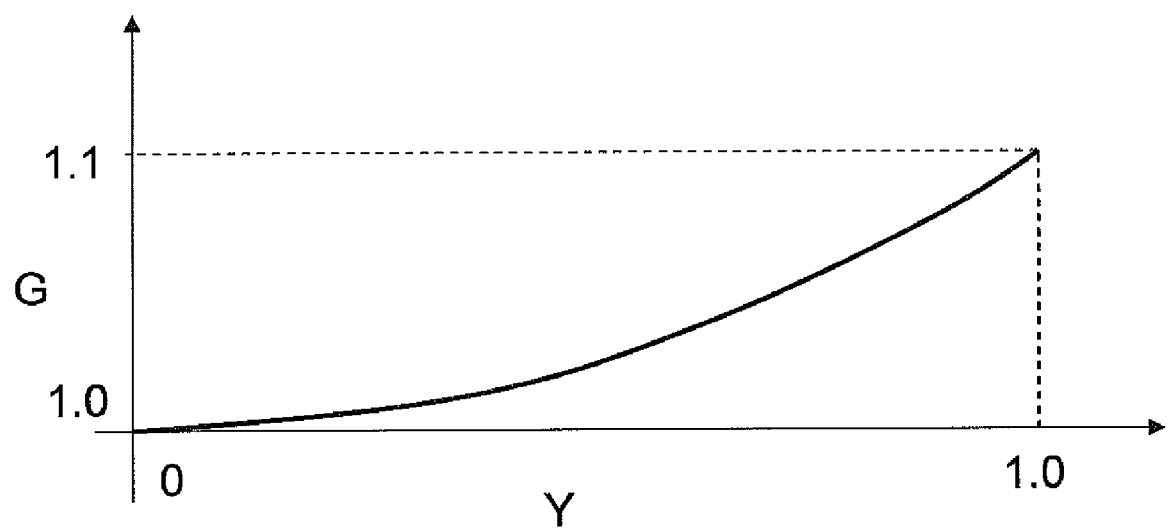
FIG. 5 is a graph of gain G (barrel shape)
Figure 6:
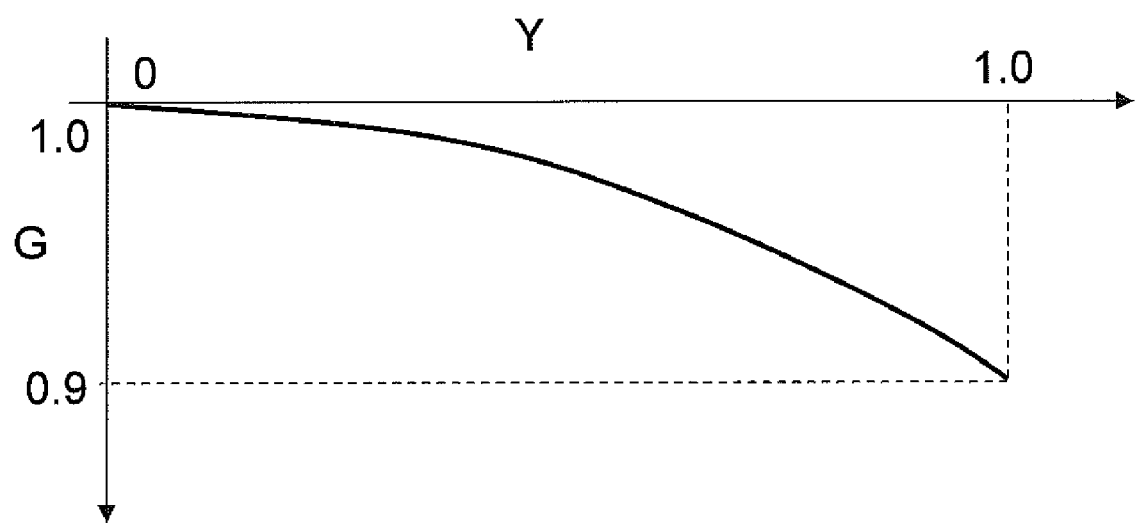
FIG. 6 is a graph of gain G (spool shape)

The gain G in Equation 3 indicates a gain function configured to convert the actual image height Y into the ideal image height Y'. When the maximum value of the actual image height Y is 1, the gain shape can be expressed as in FIGS. 5 and 6. In FIGS. 5 and 6, the vertical axis is the gain G and the horizontal axis is the actual image height Y.

With the gain shape shown in FIGS. 5 and 6, as the actual image height Y increases (that is, as the distance from the optical center O increases), the absolute value of the gain G gradually becomes larger. This means that the amount of distortion around the outer peripheral part of the image is greater than the amount of distortion at the middle.

When the gain G is greater than 1 as shown in FIG. 5, the image expands outward when the actual image height Y is converted into the ideal image height Y'. That is, the gain shape shown in FIG. 5 means that the distortion is barrel shaped as in FIG. 3.

On the other hand, if the gain G is less than 1 as shown in FIG. 6, the image contracts inward when the actual image height Y is converted into the ideal image height Y'. That is, the gain shape shown in FIG. 6 means that the distortion is spool shaped as in FIG. 4.

Thus, the distortion can be visually represented by defining the gain G as above.

Correction Ratio

If the above-mentioned gain G is used, it is theoretically possible to correct distortion completely.

However, it is conceivable that there will be cases when it is preferable not to correct the distortion completely. For instance, humans are not that sensitive to barrel-shaped distortion, but tend to react sensitively to spool-shaped distortion. Furthermore, since an image in which barrel-shaped distortion has occurred appears slightly rounded, it gives an impression of warmth.

For example, with barrel-shaped distortion, if the proportion of distortion correction is reduced, barrel-shaped distortion will remain in the corrected image, and a warmer image will be obtained. With spool-shaped distortion, if the proportion of distortion correction is increased, spool-shaped distortion will be completely eliminated from the corrected image, giving a warmer image that is rounded as with barrel-shaped distortion.

In view of this, the digital camera 1 is provided with a function of adjusting the proportion of distortion correction.

More specifically, the gain TG obtained by multiplying the gain G by the correction ratio T is defined as in the following Equation 4.

$$TG = (G-1) \times T + 1 = 1 - (C3 \times T) \times Y^2 - (C5 \times T) \times Y^4 - (C7 \times T) \times Y^6 \tag{4}$$

The extent of distortion correction can be adjusted by using a gain TG instead of the above-mentioned gain G. For example, when G>1, if the correction ratio is set to be T<1, then the gain TG will be smaller than the gain G. That is, with barrel-shaped distortion, if the correction ratio T is set to be less than 1, the extent of distortion correction will be less than the correction at the gain G.

Also, when G<1, the gain TG will be less than the gain G if the correction ratio T is set to be less than 1. That is, when spool-shaped distortion, the extent of distortion correction will be less than the correction at the gain G.

Figure 7:
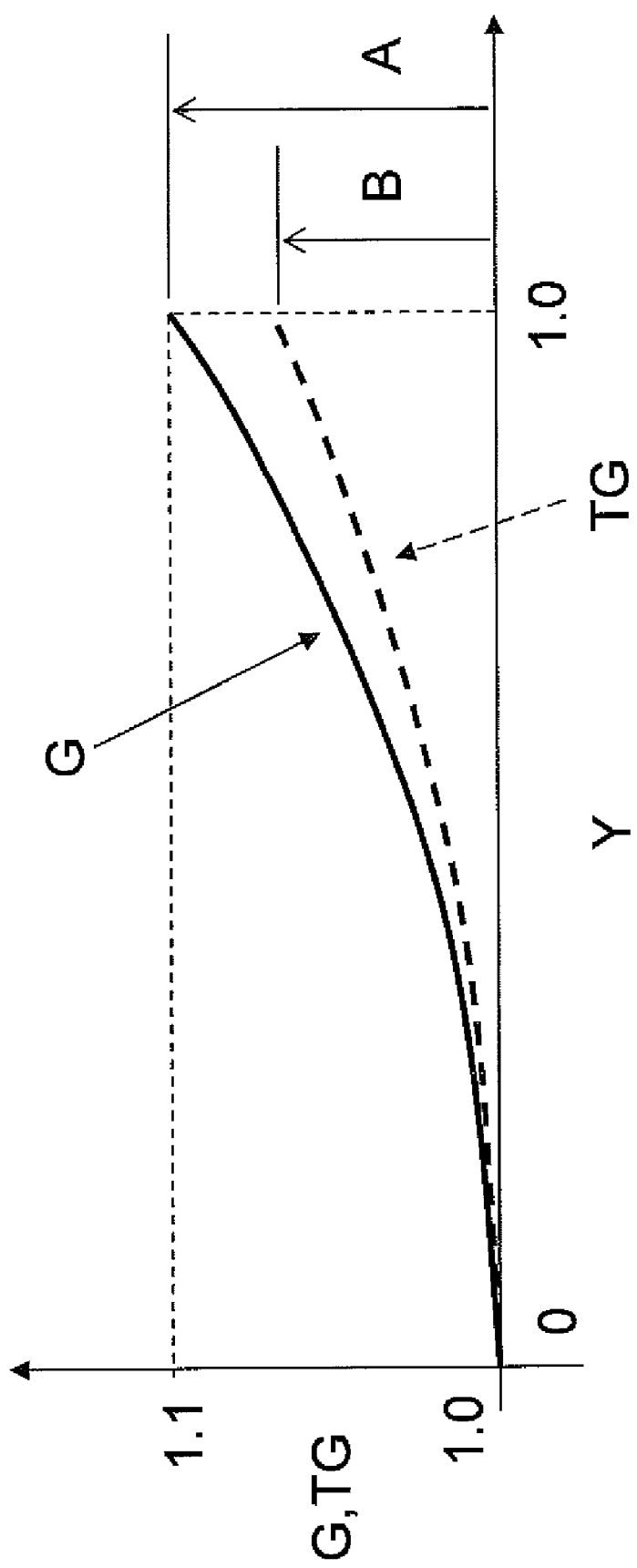
FIG. 7 is a graph of gain TG (barrel shape)
Figure 8:
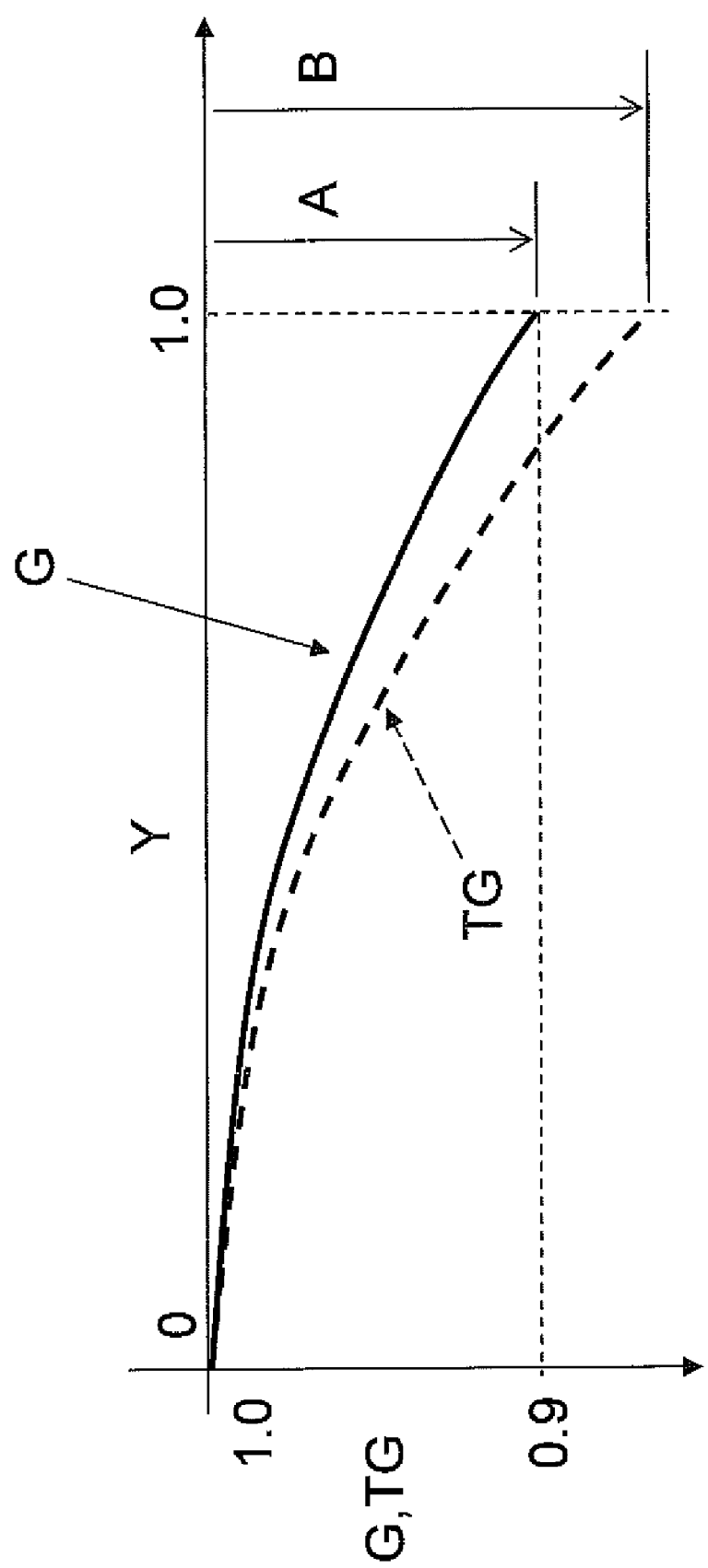
FIG. 8 is a graph of gain TG (spool shape)

The shape of the gain TG in the above case can be expressed as in FIGS. 7 and 8, for example. Here, the correction ratio T can be expressed by the following Equation 5.

$$T = \frac{B}{A} \tag{5}$$

Magnification Correction Value

Distortion can be corrected according to the characteristics of the optical system by the above method.

However, when correcting spool-shaped distortion, since G<1, the corrected image is smaller than the actual image. Accordingly, depending on the conditions, the corrected image may be smaller than the CCD image sensor 110. As a result, there may be a region of missing information in the image outputted from the CCD image sensor 110. This phenomenon is called a pixel defect.

Figure 9:
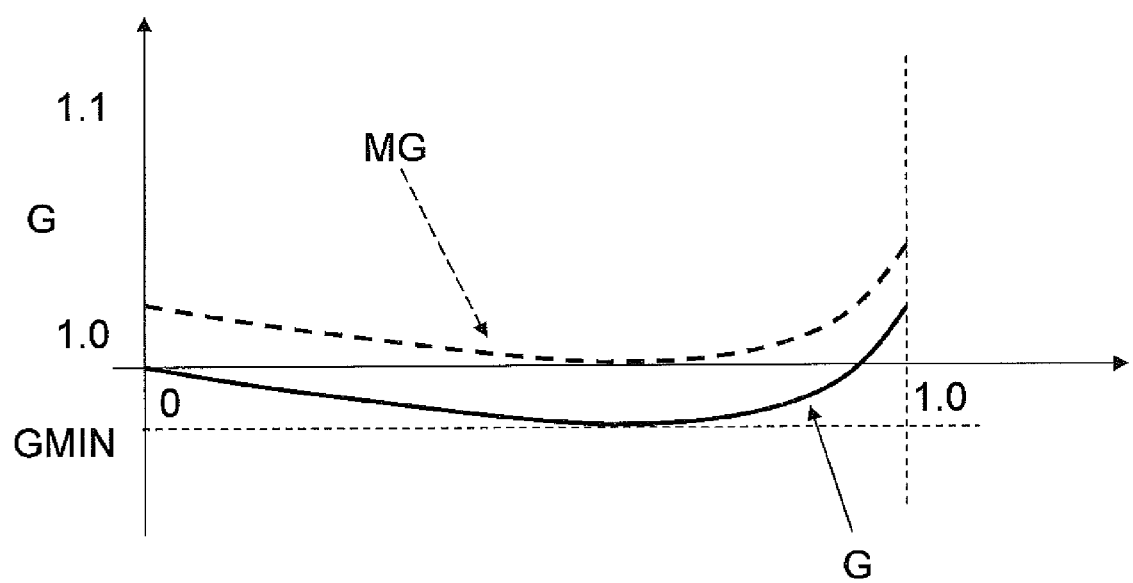
FIG. 9 is a graph of gain MG.

To prevent the occurrence of pixel defects, with this digital camera 1 a magnification correction value M is used that corrects the magnification of the entire image in distortion correction. For example, using a magnification correction value M, the gain G is corrected so that the gain G≧1 within a range of 0≦actual image height Y≦1, as shown in FIG. 9.

More specifically, the gain MG that takes the magnification correction value M into account is defined as in the following Equation 6.

$$MG = (1 - C3 \times Y^2 - C5 \times Y^4 - C7 \times Y^6) \times M \quad (6)$$

The minimum value is found in a range of $0 \leq Y \leq 1$, and the M at which the minimum value is at least 1 is multiplied by the gain shape. The minimum value can be found from Equation 7, in which the gain G is differentiated with the actual image height Y.

$$\frac{dG}{dY} = -2 \times C3 \times Y - 4 \times C5 \times Y^3 - 6 \times C7 \times Y^5 \quad (7)$$

More specifically, the solution (such as a or b) is found when Equation 7 is 0, and the gain G is compared at four points of Y=0, a, b, and 1. As a result, the actual image height Y when the gain G is at its minimum can be found. The minimum value for the gain G can be found from this actual image height Y and Equation 7. When the minimum value for the gain G=GMIN, MG$\geq$1 can be satisfied by setting the magnification correction value to M=1/GMIN.

Thus, by setting the magnification correction value M, the corrected image can be kept to at least a specific size, and the corrected image can be prevented from being smaller than the size of the CCD image sensor 110. Specifically, the occurrence of pixel defects can be prevented.

(4) Conclusion

As discussed above, when the correction ratio T and the magnification correction value M are taken into account, the final gain TMG is expressed by the following Equation 8.

$$TMG = \{1 - (C3 \times T) \times Y^2 - (C5 \times T) \times Y^4 - (C7 \times T) \times Y^6\} \times M \quad (8)$$

Equations 8 and 3 give Equation 9 as follows, which is used to convert the actual image height Y into the ideal image height Y'.

$$Y' = TMG \times Y = \quad (9)$$
$$\{1 - (C3 \times T) \times Y^2 - (C5 \times T) \times Y^4 - (C7 \times T) \times Y^6\} \times M \times Y$$

An example of calculating will now be described for when C3=0.2, C5=−0.2, C7=−0.1, and T=0.9. Under these conditions, the amount of distortion DY and the gain G are expressed as in the following Equations 10 and 11, from Equations 3 and 4.

$$DY(Y) = 0.2 \times Y^3 - 0.2 \times Y^5 - 0.1 \times Y^7 \quad (10)$$

$$G = 1 - 0.2 \times Y^2 + 0.2 \times Y^4 + 0.1 \times Y^6 \quad (11)$$

Figure 10A:
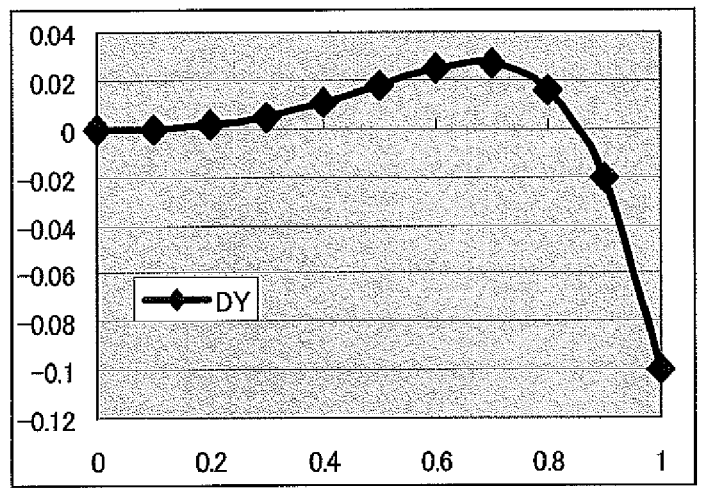
FIG. 10A is a graph of an example of a distortion amount DY, 10B an example of gain G, and 10C an example of gain TMG.
Figure 10B:
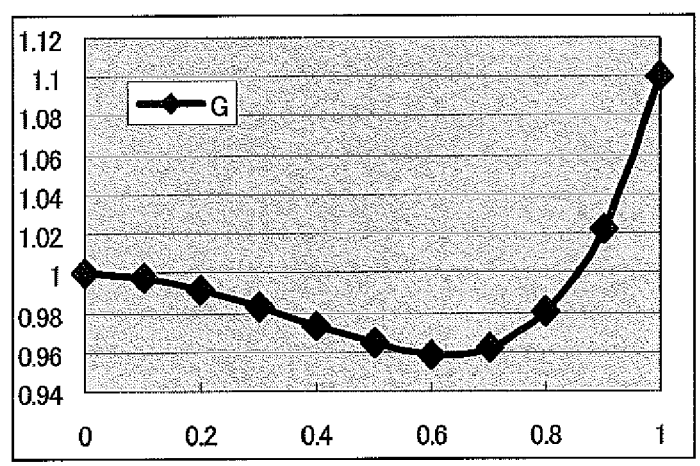

Equations 10 and 11 are expressed by the graphs in FIGS. 10A and 10B. When Equation 11 is differentiated to find the minimum value for the gain G, the result is the following Equation 12.

$$\frac{dG}{dY} = -0.4 \times Y + 0.8 \times Y^3 + 0.6 \times Y^5 = 0.1 \times Y \times (6 \times Y^4 + 8 \times Y^2 - 4) \quad (12)$$

The minimum value for the gain G is the point at which the slope of the gain G is zero, or the point at which Y=0, 1. If we assume that $Z=Y^2$, the following quadratic equation is derived.

$$6 \times Y^4 + 8 \times Y^2 - 4 = 6Z^2 + 8Z - 4 = 0 \quad (13)$$

The solution to Equation 13 is Z=0.387426, −1.72076.

The condition here under which no pixel defects occur is that the solution be the minimum value of the gain G at 0.49<Y<1 when the aspect ratio is 16:9. Accordingly, from 0.2401<Z<1, 0.49<Y<1, we obtain Z=0.387426, that is, Y=0.622435.

The minimum value of the gain G at Y=0.49, 0.622435, 1 is Y=0.622435, and GMIN=0.95835.

Therefore, the gain function MG is as follows.

$$MG = \frac{(1 - 0.2 \times Y^2 + 0.2 \times Y^4 + 0.1 \times Y^6)}{0.95835} \quad (14)$$

Finally, taking into account that T=0.9, the following gain function TMG can be derived from Equations 14 and 4.

$$TMG = 1.039114 - 0.18782 \times Y^2 + 0.18782 \times Y^4 + 0.09391 \times Y^6 \quad (15)$$

Figure 10C:
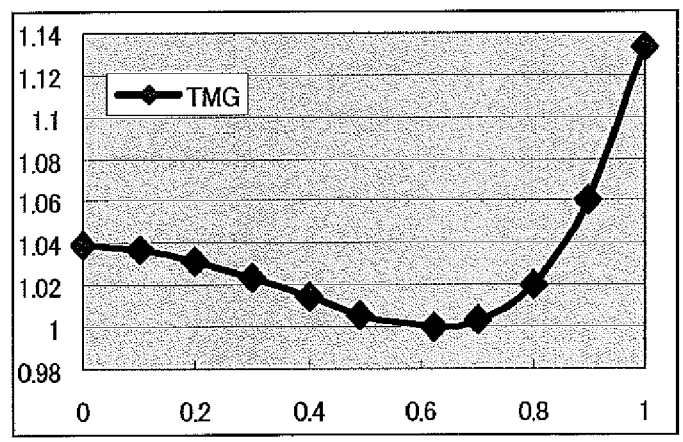

This Equation 15 can be expressed as in FIG. 10C. In FIG. 10C, since the gain TMG is at least one within the range of $0 \leq Y \leq 1$, even when correcting spool-shaped distortion, it can be corrected so that the image expands. Consequently, the occurrence of defective pixels can be prevented.

Distortion Correction Information

With the distortion correction described above, the correction coefficients C3, C5, and C7 correspond only to a single distortion characteristic.

However, with a digital single lens reflex camera having an interchangeable lens unit, since the specifications of the optical system will vary with the type of interchangeable lens unit, a correction coefficient must be selected that matches the optical system of the interchangeable lens unit to be mounted.

Even with a given optical system, the characteristics of distortion will vary with the focal distance and the position of the focus lens, so a correction coefficient must be selected that matches the focal distance and the position of the focus lens.

In view of this, a correction coefficient table E (an example of the first correction information) is held in the flash memory 242 of the interchangeable lens unit 200. More specifically, as shown in FIG. 11, the correction coefficient table E of the lens controller 240 has zoom information ZENC, focus information FENC, a plurality of correction coefficients C3, C5, and C7, and a plurality of correction ratios T. The correction coefficient table E, zoom information ZENC, focus information FENC, correction coefficients C3, C5, and C7, and correction ratios T are examples of information use to correct distortion.

With the correction coefficient table E, the correction coefficients C3, C5, and C7 and correction ratios T are arranged on the basis of the zoom information ZENC2 and focus information FENC2. The amount of data of the zoom information ZENC is Nz+1, for example. The amount of data of the focus information FENC is Nf+1, for example. The amount of data of the zoom information ZENC and the focus information FENC can be smaller than the amount of data of the zoom information ZENC1 and the focus information FENC1 (discussed below) outputted from the zoom information production part 247 and focus information production part 248 because of the interpolation operation function discussed below. Accordingly, the data capacity of the correction coefficient table E can be smaller than that of a correction coefficient table needed in the distortion correction processing. The interpolation operation will be discussed below.

The correction coefficients C3, C5, and C7 and the correction ratios T can be selected from this correction coefficient table E. When the selected correction coefficients C3, C5, and C7 and correction ratios T are used to perform the above-mentioned distortion correction, it is possible to perform distortion correction that is suited to the optical system 201 being used.

Detailed Configuration of Lens Controller and Camera Controller

The lens controller 240 and camera controller 140 can have various configurations to realize the above-mentioned distortion correction function.

More specifically, as shown in FIG. 2, the lens controller 240 has a lens information output part 243 and a correction coefficient output part 244. These parts are functional blocks, and are realized by the CPU of the lens controller 240, the DRAM 241, and the flash memory 242. The flash memory 242 holds the correction coefficient table E and lens data (an example of first identification information) such as ID information of the interchangeable lens unit 200 for identifying the interchangeable lens unit 200.

The lens information output part 243 sends the lens data held in the flash memory 242 to the camera controller 140. The correction coefficient output part 244 sends the correction coefficient table E held in the flash memory 242 to the camera controller 140. For example, this sending of information is carried out when the power is turned on or when the interchangeable lens unit 200 is mounted on the camera body 100.

The camera controller 140 has a focus information acquisition part 143 (an example of the second information acquisition part), a zoom information acquisition part 144 (an example of the first information acquisition part), a correction coefficient acquisition part 145 (an example of the correction information acquisition part), a correction coefficient selector 146 (an example of the correction coefficient selector), an operation part 147, and a magnification correction value operation part 148. These parts are functional blocks, and are realized by the CPU (not shown) of the camera controller 140, the DRAM 141, and the flash memory 142 (an example of the second holding part).

The focus information acquisition part 143 acquires position information for the focus lens 230 in the optical system 201 from the lens controller 240. More specifically, as discussed above, the lens controller 240 has the focus information production part 248. The focus information production part 248 computes the position of the focus lens 230 on the basis of the detection results of the relative position detector 231 and the absolute position detector 232. The focus information acquisition part 143 acquires focus information indicating the position of the focus lens 230 from the focus information production part 248. This focus information is used for focus adjustment and distortion correction.

The zoom information acquisition part 144 acquires zoom information for the optical system from the lens controller 240. More specifically, as discussed above, the lens controller 240 has the zoom information production part 247. The focal distance of the optical system 201 varies according to the position of the zoom lens 210. The zoom information production part 247 computes the focal distance on the basis of position information for the zoom lens 210 detected by the detector 212. The zoom information includes the focal distance or the position of the zoom lens 210. The zoom information acquisition part 144 acquires zoom information from the zoom information production part 247.

The acquisition of focus information and zoom information is repeated at a specific sampling period.

The correction coefficient acquisition part 145 acquires the above-mentioned correction coefficient table E pre-held in the flash memory 242 of the interchangeable lens unit 200 from the lens controller 240. The correction coefficient table E is information used to correct distortion, and is a table specific to the optical system 201 of the interchangeable lens unit 200. With this correction coefficient table E, a plurality of correction coefficients are arranged on the basis of zoom information and focus information. The correction coefficient table E acquired by the correction coefficient acquisition part 145 is held in the flash memory 142 of the camera controller 140.

The correction coefficient selector 146 selects correction coefficients corresponding to the zoom information and focus information from the correction coefficient table E held in the flash memory 142 as a selected correction coefficient group. More specifically, since the interpolation operation is carried out by the operation part 147, four sets of correction coefficients and four correction ratios T are selected by the correction coefficient selector 146.

The interpolation operation will now be described. The amount of data in the correction coefficient table E is set as low as possible, taking into account the transmission of data from the interchangeable lens unit 200 to the camera body 100. For example, there are 256 types of zoom information computed by the zoom information production part 247. There are 64 types of focus information computed by the focus information production part 248. Therefore, under normal circumstances, the amount of data for the correction coefficients C3, C5, and C7 and the correction ratios T is 256×4 for each.

However, when there is a large amount of data in the correction coefficient table E, it takes a long time to transfer the correction coefficient table E to the camera body 100, and the start-up of the digital camera 1 takes a long time.

In view of this, the amount of data in the correction coefficient table E is reduced with the digital camera 1. For example, the number of pieces of data in the zoom information ZENC is 16 (that is, Nz=15) and the number in the focus information is 4 (that is, Nf=3).

Accordingly, with the camera body 100, the correction coefficient selector 146 selects the zoom information ZENC2 and focus information FENC2 corresponding to the zoom information ZENC1 and focus information FENC1 from the zoom information ZENC and focus information FENC of the correction coefficient table E on the basis of the zoom information ZENC1 and focus information FENC1 sent from the lens controller 240. More specifically, the correction coefficient selector 146 selects a specific value which is smaller than and closest to the zoom information ZENC1 as the zoom information ZENC2, and a specific value which is smaller than and closest to the focus information FENC1 as the focus information ZENC2.

Furthermore, the correction coefficient selector 146 selects the correction coefficients C3, C5, and C7 and the correction ratios T from the correction coefficient table E on the basis of the selected zoom information ZENC2 and focus information FENC2. For example, for the correction coefficient C3, the correction coefficient selector 146 selects the following four correction coefficients C3 from the table.

C3(ZENC2,FENC2)
C3(ZENC2,FENC2+1)
C3(ZENC2+1,FENC2)
C3(ZENC2+1,FENC2+1)

Figure 12:
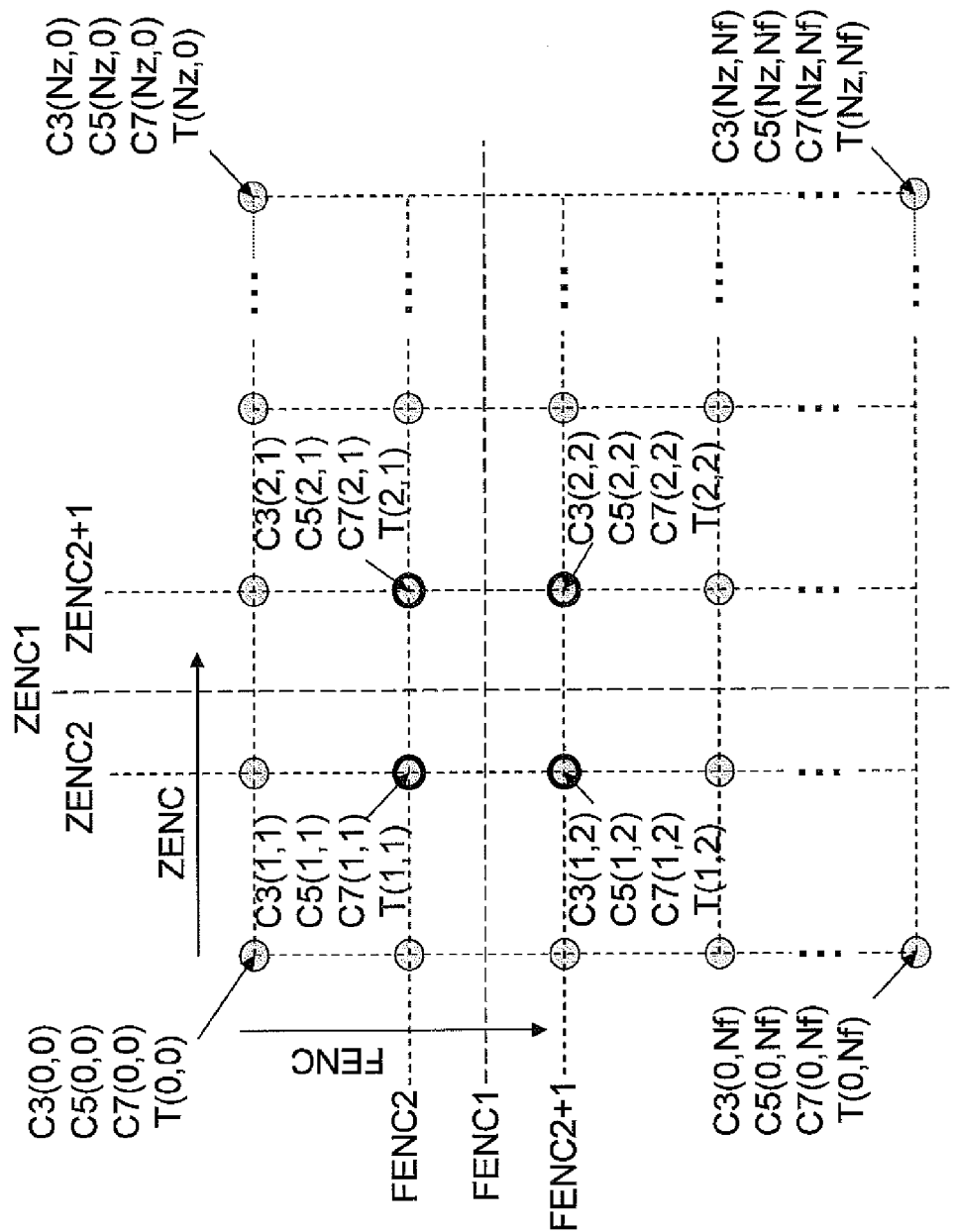
FIG. 12 is a diagram explaining a correction coefficient table.

Similarly, the correction coefficients C5 and C7 and the correction ratios T are selected from the correction coefficient table E by the correction coefficient selector 146 (see FIG. 12). FIG. 12 shows an example of ZENC2=1 and FENC2=1.

The operation part 147 uses the four sets of correction coefficients C3, C5, and C7 and four correction ratios T selected by the correction coefficient selector 146 to calculate four gains TG from Equation 4.

Meanwhile, the magnification correction value operation part 148 uses Equation 7 to compute the magnification correction value M for each gain G.

The gain TMG of Equation 8 is computed by the operation part 147 from the gains TG and the magnification correction value M.

Figure 13:
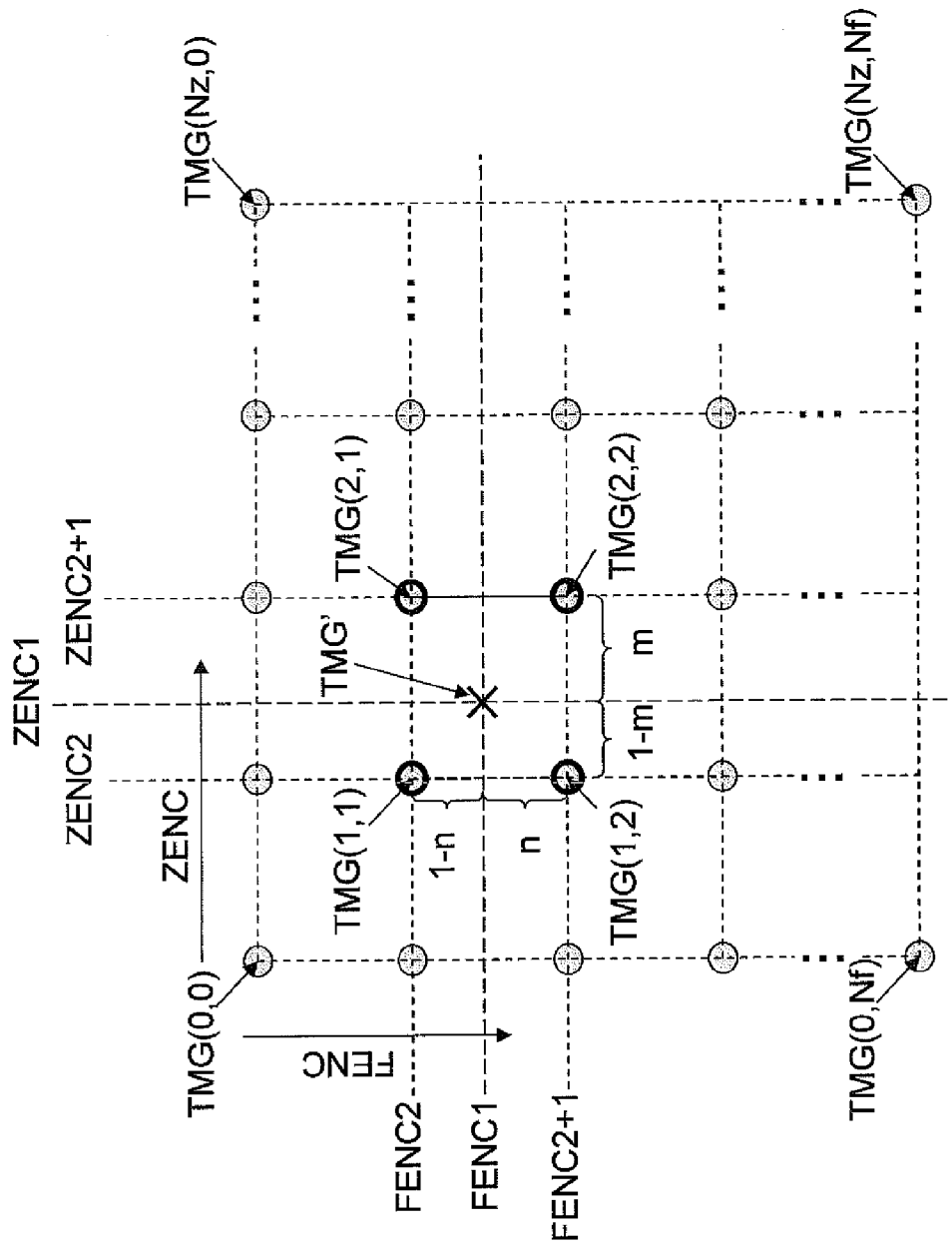
FIG. 13 is a diagram explaining an interpolation operation.

As shown in FIG. 13, a gain TMG' corresponding to the zoom information ZENC1 and the focus information FENC1 is computed by interpolation from the four gains TMG. More specifically, the operation part 147 uses the following Equation 16 to execute interpolation operation on the gain TMG'.

$$TMG'(ZENC1, FENC1) = m \times \{n \times TMG(ZENC2, FENC2) + \quad (16)$$
$$(1-n) \times TMG(ZENC2, FENC2+1)\} +$$
$$(1-m) \times \{n \times TMG(ZENC2+1, FENC2) +$$
$$(1-n) \times TMG(ZENC2+1, FENC2+1)\}$$

The numerical values m and n are determined by ZENC1, FENC1, ZENC2, and FENC2, and are determined by the operation part 147 on the basis of these data.

The correction processor 193 performs distortion correction processing on the image data acquired by the CCD image sensor 110 on the basis of the gain TMG' computed by the operation part 147. More specifically, the correction processor 193 uses the gain TMG' and the above-mentioned Equation 9 to sequentially subject the image data for one frame to distortion correction processing.

When correction processing is performed, the actual image height Y means the coordinates of each pixel. For example, for a pixel Pn (xn, yn), when a coordinate xn and a coordinate yn are inputted to Y in Equation 9, the corrected coordinates xn' and yn' can be computed. The corrected coordinates xn' and yn' express the position where the pixel is to be disposed when there is no distortion. The pixel Pn (xn, yn) is thus converted into Pn (xn', yn'). This coordinate conversion processing is performed for all the pixels in the image data for one frame. This coordinate conversion processing can be considered processing for modifying an image with distortion into an image in which the distortion has been corrected.

After this correction processing has been performed for the image data of one frame, the correction processor 193 crops out the image data of the specified size from the image data that has undergone coordinate conversion processing. The correction processor 193 performs interpolation operation on the cropped image data, so that the pixels that are no longer laid out equidistantly due to distortion processing are returned to an equidistant layout that is the same as that of the image data prior to correction. Consequently, it is possible to produce image data of the same size as the pre-correction image data inputted to the correction processor 193, and that has undergone distortion correction.

The corrected image data is outputted from the correction processor 193 to the electronic zoom unit 194. The electronic zoom unit 194 and the compressor 195 subject the corrected image data to specific processing.

The above-mentioned selection processing, interpolation operation, and magnification correction value computation are carried out at a specific period. The above-mentioned series of image processing is also carried out for each frame. Accordingly, distortion correction can be performed not only on still pictures, but also on moving pictures. That is, an image that has undergone distortion correction can be recorded or displayed during moving picture capture or during live view, as well.

Operation at Start-up

Figure 14:
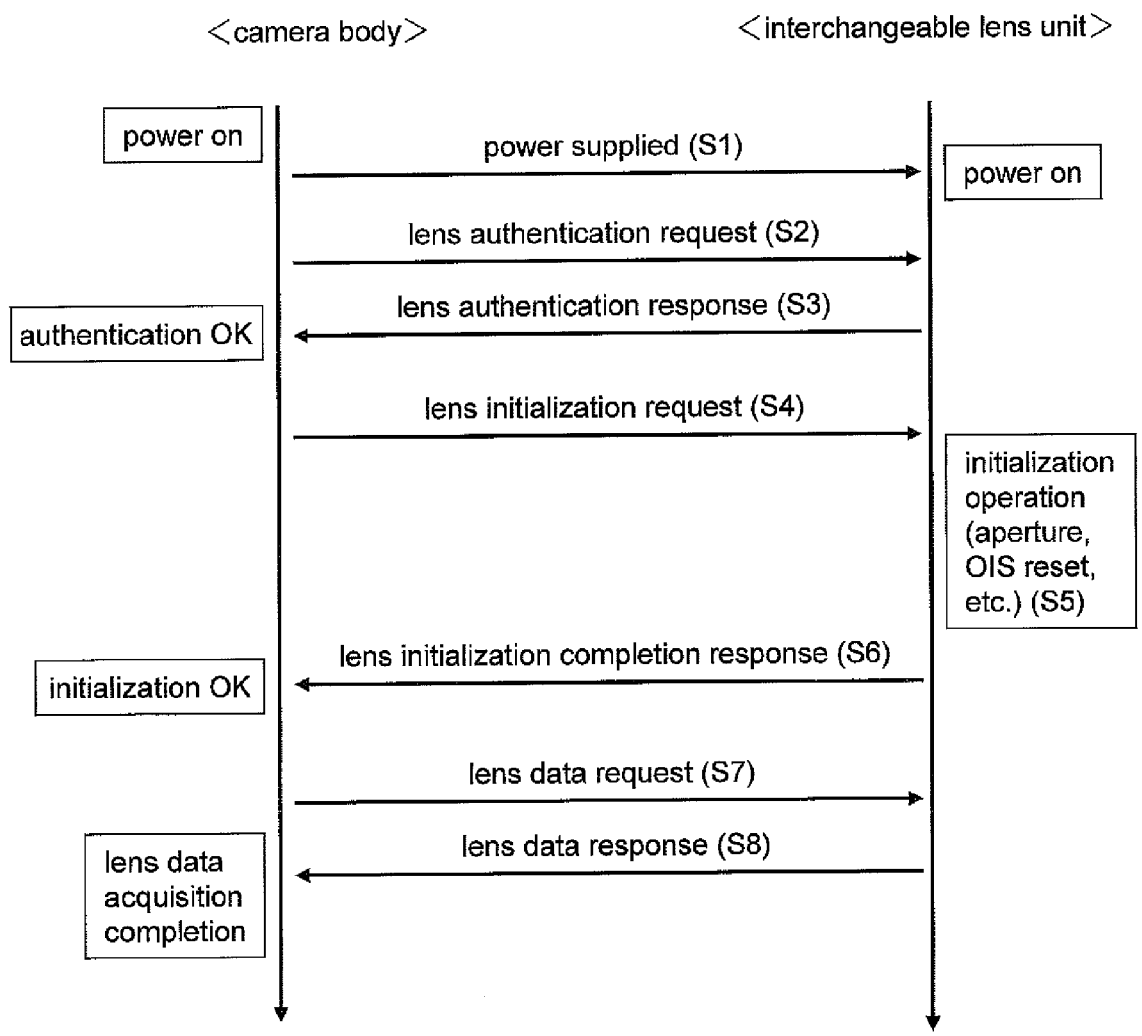
FIG. 14 is a flowchart of start-up.

First, the start-up operation of the digital camera 1 will be described. FIG. 14 is a flowchart of the start-up operation of the digital camera 1.

In a state in which the interchangeable lens unit 200 has been mounted to the camera body 100, the user turns on the power to the camera body 100. As a result, the supply of power from the power supply 160 to the interchangeable lens unit 200 is begun via the body mount 150 and lens mount 250 (S1).

Next, the camera controller 140 asks the lens controller 240 for authentication information about the interchangeable lens unit 200 (S2). Here, the authentication information about the interchangeable lens unit 200 includes information about whether or not the interchangeable lens unit 200 has been mounted, and information about whether or not any accessories have been mounted. The lens controller 240 responds to the lens authentication request from the camera controller 140, and sends authentication information to the camera controller 140 (S3).

Next, the camera controller 140 asks the lens controller 240 to perform the initialization operation (S4). Upon receiving this request, the lens controller 240 performs the initialization operation, such as resetting the aperture and resetting the OIS lens 220 (S5). The lens controller 240 sends a message to the camera controller 140 to the effect that the lens initialization operation has been completed (S6).

Next, the camera controller 140 asks the lens controller 240 to transmit lens data (S7). This lens data is information for identifying the interchangeable lens unit 200. Lens information includes, for example, the lens name, lens ID, F number, and focal distance. The lens data is held in the flash memory 242 (an example of the first holding part). The lens information output part 243 of the lens controller 240 reads the lens data from the flash memory 242 and sends it to the camera controller 140 (S8). The lens data is taken in by a lens information acquisition part 149 of the camera controller 140, and held in the flash memory 142.

Figure 15:
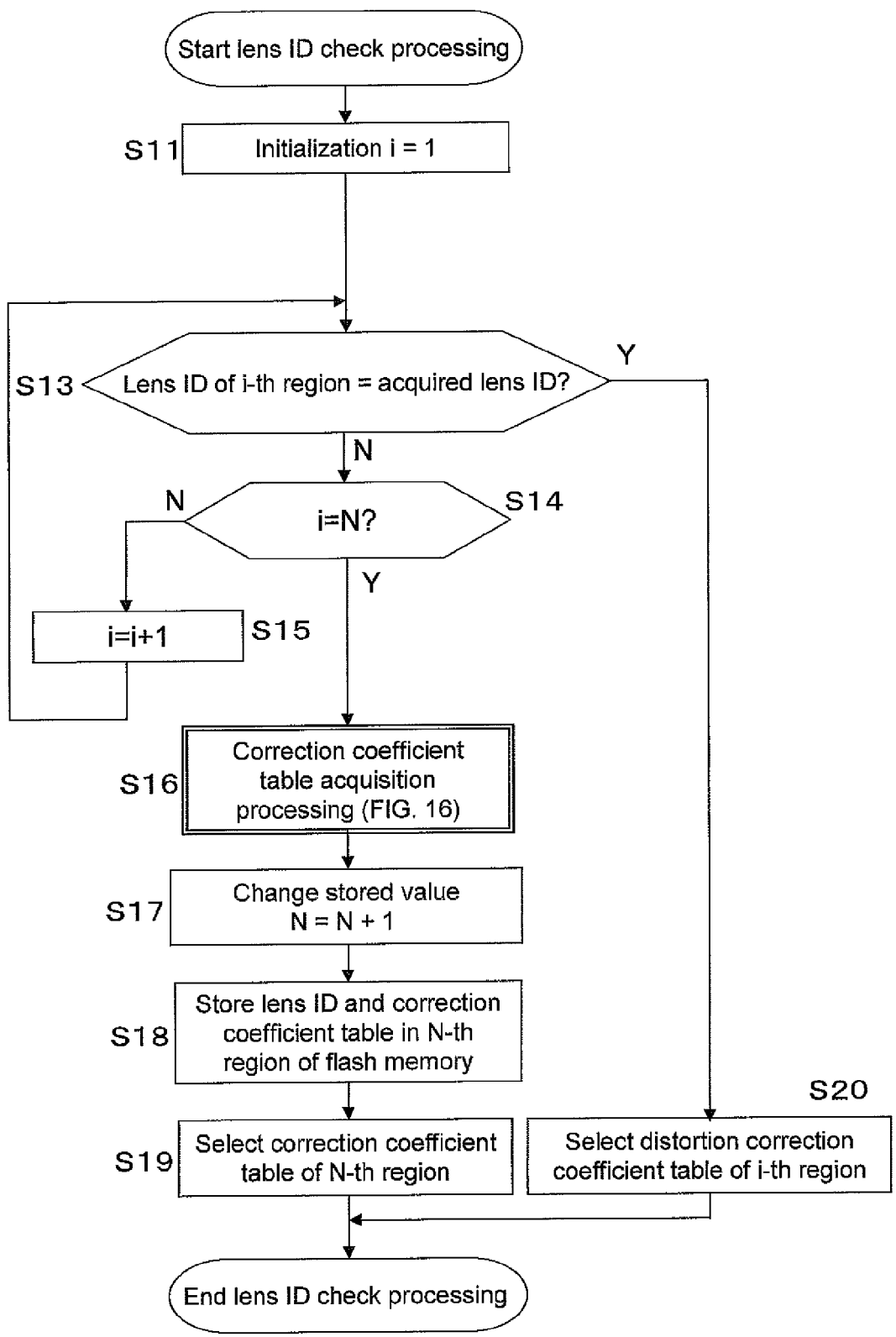
FIG. 15 is a flowchart of lens ID verification processing.

This digital camera 1 has a function of storing a correction coefficient table associated with lens ID, and a function of utilizing the correction coefficient tables stored in the past. More specifically, as shown in FIG. 15, a variable i is reset upon completion of the above-mentioned step S8 (S11).

Correction coefficient tables brought in previously and the lens ID for the interchangeable lens units thereof are associated and held in the flash memory 142. Temporarily stored lens IDs are compared with previously stored lens IDs (an example of second identification information) by a comparator 167 (S13). If it is determined by the comparator 167 that there is a matching lens ID, the correction coefficient table corresponding to that lens ID is selected by the correction coefficient selector 146 (S20). More specifically, the correction coefficient table held in a region i is selected by the correction coefficient selector 146. In this case, since there is no need to send the correction coefficient table from the interchangeable lens unit 200 to the camera body 100, the start-up time can be shortened.

On the other hand, if it is determined by the comparator 167 that there is no matching lens ID, it is confirmed by the comparator 167 that i=N (S14). The variable N indicates the number of lens IDs that have already been stored.

If i=N, then the comparison of all the lens IDs has ended, so processing for acquiring a correction coefficient table E is commenced (S16). The acquisition processing for the correction coefficient table E will be discussed below. If i≠N, the variable i is incremented, and steps S13 and S14 are repeated (S15).

Figure 16:
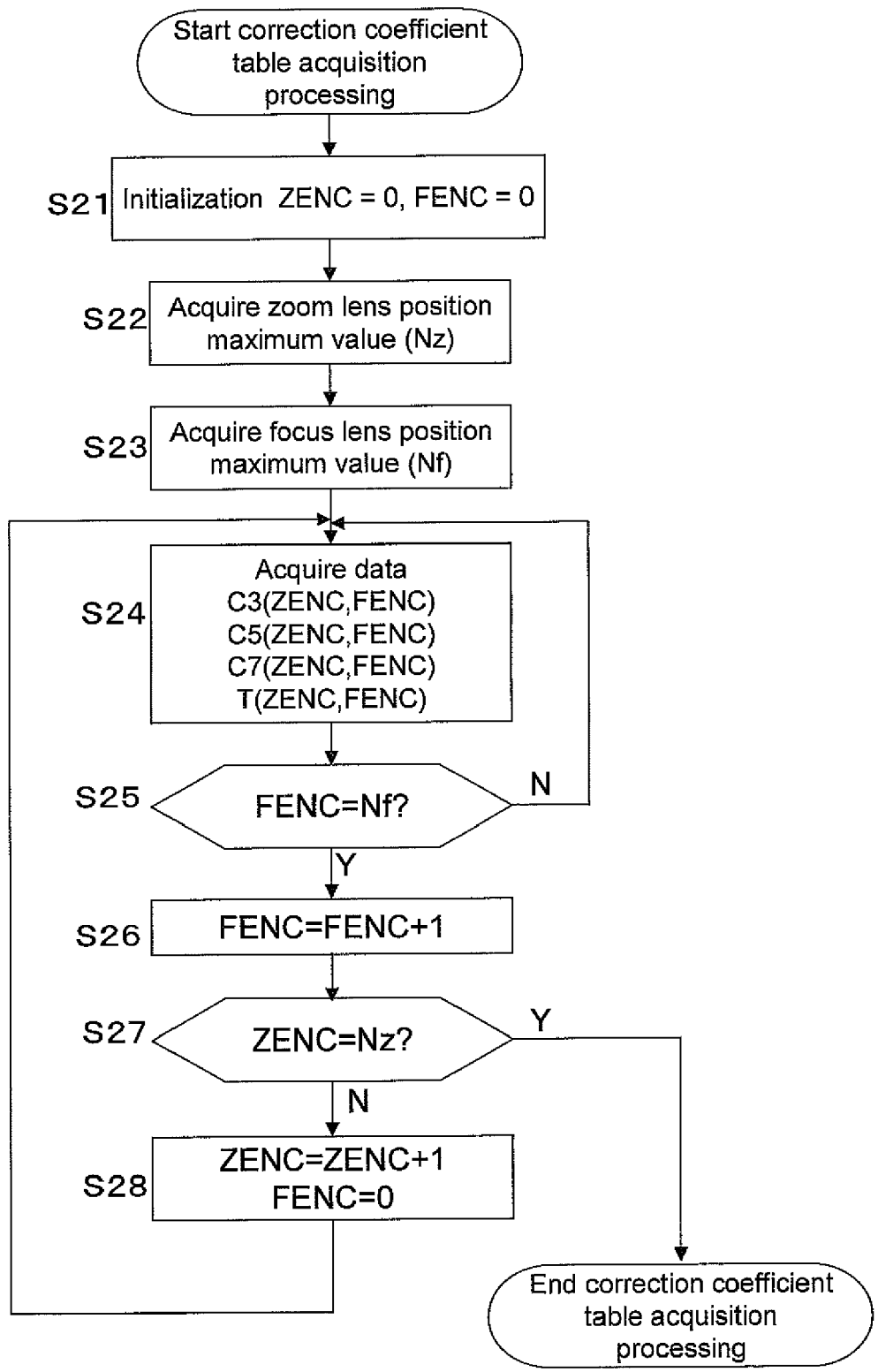
FIG. 16 is a flowchart of correction coefficient table acquisition processing.

In the correction coefficient table acquisition step S16, the correction coefficient table E is sent from the correction coefficient output part 244 to the correction coefficient acquisition part 145. The correction coefficient table E that is sent is taken in by the correction coefficient acquisition part 145. More specifically, as shown in FIG. 16, the zoom information ZENC and focus information FENC are initialized (S21). Next, the maximum value Nz of the zoom information is acquired by the correction coefficient acquisition part 145 and stored in a specific region of the flash memory 142 (S22). The maximum value Nf of the focus information is then acquired by the correction coefficient acquisition part 145 and stored in a specific region (S23).

Next, correction coefficient tables E are acquired by the correction coefficient acquisition part 145. More specifically, C3 (ZENC, FENC), C5 (ZENC, FENC), C7 (ZENC, FENC), T (ZENC, FENC), are successively sent from the correction coefficient output part 244 to the correction coefficient acquisition part 145 and stored in a specific region of the flash memory 142 (S24).

It is determined whether or not the focus information FENC is at its maximum value Nf (S25). If the focus information FENC is not at its maximum value Nf, the focus information FENC is incremented (S26). Steps S24 and S25 are repeated until the focus information FENC reaches the maximum value Nf.

If the focus information FENC is at its maximum value Nf, it is determined whether or not the zoom information ZENC is at its maximum value Nz (S27). If the zoom information ZENC is not at its maximum value Nz, the zoom information ZENC is incremented (S28). After this, steps S24 to S27 are repeated until the zoom information ZENC reaches the maximum value Nz. Once the zoom information ZENC reaches the maximum value Nz, the correction coefficient table acquisition processing is ended.

Thus, the correction coefficients C3, C5, and C7 of the correction coefficient table E are successively sent to the camera body 100 and stored in the flash memory 142 on the camera body 100 side.

As shown in FIG. 15, when the correction coefficient table acquisition processing ends, the memory number N is updated to N+1 (S17). The acquired lens ID and correction coefficient table are stored in the N-th region of the flash memory 142 (S18). The correction coefficient table in the N-th region is selected by the correction coefficient selector 146 (S19).

Operation During Imaging

If the camera controller 140 ascertains the lens data for the interchangeable lens unit 200 mounted to the camera body 100, an imaging capable state is entered. In this state, the camera controller 140 asks the lens controller 240 at a specific period for lens state data indicating the state of the interchangeable lens unit 200. The lens state data includes, for example, zoom information ZENC1, focus information FENC1, and aperture value information. In response to the request from the camera controller 140, the lens controller 240 sends the requested lens state data to the camera controller 140 at a specific period. This allows the camera controller 140 to ascertain in real time the state of the interchangeable lens unit 200.

With the digital camera 1, an image indicating the image data produced by the CCD image sensor 110 can be displayed in real time on the liquid crystal monitor 120 as a through-image. This imaging mode is called the live view mode. In the live view mode, a real-time image of the subject is displayed on the liquid crystal monitor 120, so the user can decide on the composition for capturing a still picture while looking at the liquid crystal monitor 120. Whether or not to use the live view mode can be selected by the user. Another imaging mode that the user can select besides the live view mode is a mode in which the subject image from the interchangeable lens unit 200 is checked with the electronic viewfinder 180. In the live view mode, since image data is successively produced by the CCD image sensor 110, it is easy to perform contrast-based auto-focus (hereinafter also referred to as contrast AF) using this image data.

If the user presses a release button 130 half way down, contrast AF begins and the focus lens 230 is driven by the focus motor 233 to the focus position. This brings into focus the subject image produced by the CCD image sensor 110.

After auto-focusing, the aperture value of the optical system 201 is adjusted to a specific value by the aperture unit 260. After this, image data of the subject image is acquired by the CCD image sensor 110. The image data outputted from the CCD image sensor 110 is successively converted by the A/D converter 111 into digital signals. These digital signals are subjected to gamma correction processing, white balance correction processing, and scratch correction processing, for example, by the preprocessor 191.

Figure 17:
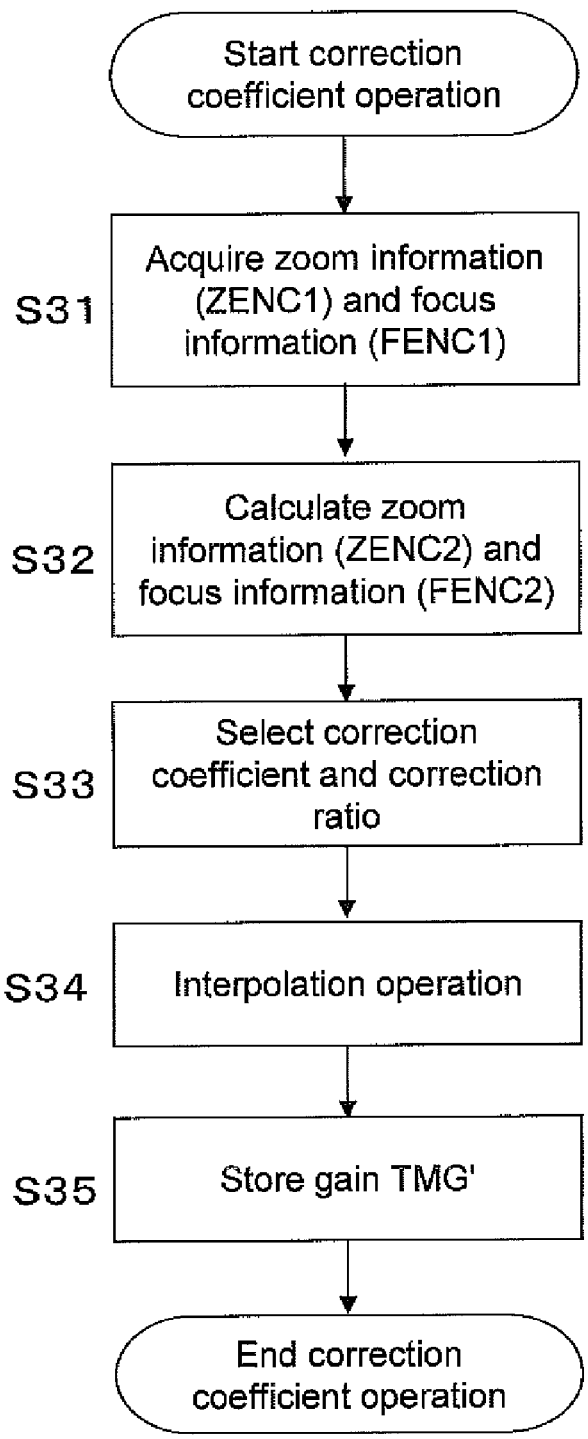
FIG. 17 is a flowchart of a correction coefficient operation.

One frame of image data outputted from the preprocessor 191 is subjected to the above-mentioned distortion correction processing by the correction processor 193. More specifically, the zoom information ZENC1 and the focus information FENC1 are acquired at a specific period by the focus information acquisition part 143 (S31). The correction coefficients C3, C5, and C7 and the correction ratio T are selected from the correction coefficient table E by the correction coefficient selector 146 on the basis of the zoom information ZENC1 and the focus information FENC1 (S32). More precisely, as shown in FIG. 17, the zoom information ZENC2 corresponding to the zoom information ZENC1 is selected by the correction coefficient selector 146 from the correction coefficient table E, and the focus information FENC2 corresponding to the focus information FENC1 is selected by the correction coefficient selector 146 from the correction coefficient table E. Four sets of the correction coefficients C3, C5, and C7 and four correction ratios T are selected by the correction coefficient selector 146 on the basis of the calculated focus information FENC2 and focus information FENC2 (S33).

The above-mentioned interpolation operation is performed by the operation part 147 using the selected four sets of correction coefficients C3, C5, and C7 and four correction ratios T (S34). Consequently, the gain TMG' corresponding to the actual zoom information ZENC1 and the focus information FENC1 sent from the lens controller 240 can be calculated (S35).

Distortion correction is performed by the correction processor 193 using Equation 9 and the gain TMG' calculated in the interpolation operation. More specifically, the image data outputted from the preprocessor 191 is subjected to coordinate conversion in the correction processor 193 from the actual image height to the ideal image height for each pixel.

One frame of coordinate converted image data is extracted from just a specific region, interpolation operation is performed between pixels that have shifted position, and image data is produced in the same size as the image data inputted to the correction processor 193.

The image data that has undergone correction processing is subjected to specific digital zoom processing by the electronic zoom unit 194. The image data that has undergone zoom processing is subjected to compression processing by the compressor 195, and recorded to the memory card 171.

3: Features

Features of the digital camera 1 are as follows.

(1) As discussed above, with this digital camera 1, since distortion is corrected using the correction coefficient table E held in the flash memory 242 of the interchangeable lens unit 200, even if the type of interchangeable lens unit changes, distortion correction can still be performed with correction information suited to the optical system of that interchangeable lens unit. Consequently, with this digital camera 1, distortion can be properly corrected even when different interchangeable lenses are mounted.

(2) With this digital camera 1, a plurality of correction coefficients corresponding to the zoom information ZENC and the focus information FENC are held as a correction coefficient table E, and correction coefficients C3, C5, and C7 are selected from the correction coefficient table E on the basis of the zoom information ZENC1 and focus information FENC1, so appropriate distortion correction corresponding to the focal distance and focal state is possible.

Here, examples of the zoom information include the focal distance and zoom lens position information. An example of focus information is focus lens position information.

(3) With this digital camera 1, the accuracy of distortion correction can be maintained while the amount of data in the correction coefficient table E can be reduced by subjecting the correction coefficient table E to interpolation operation. Consequently, the time it takes to send the correction coefficient table E from the interchangeable lens unit 200 to the camera body 100 can be reduced. For example, the start-up time after the power is turned on can be shortened.

(4) With this digital camera 1, the extent of distortion correction can be adjusted by using the correction ratio T during distortion correction. Therefore, this is effective when some distortion is to be intentionally left behind.

(5) With this digital camera 1, since distortion correction is performed using the magnification correction value M for keeping the corrected image data to at least a specific size, the corrected image data is maintained at the specific size or larger. This prevents the occurrence of what are known as pixel defects.

(6) With this digital camera 1, since a correction coefficient table already held in the flash memory 142 of the camera body 100 can be utilized, it may not be necessary to send the correction coefficient table from the interchangeable lens unit 200. That is, if a past correction coefficient table can be used, the start-up time after the power is turned on can be shortened.

Other Embodiments

The specific constitution of the present invention is not limited to that of the above embodiment, and various modifications and changes are possible without departing from the gist of the invention.

In the following description, parts having substantially the same function as in the above embodiment will be numbered the same, and will not be described again in detail.

(A) It is conceivable that an accessory unit will be mounted between the interchangeable lens unit 200 and the camera body 100. For instance, when a teleconverter 300 is mounted to the camera body 100, the characteristics of distortion will be affected by the teleconverter 300.

In this case, the appropriate distortion correction will be possible if it is performed by taking into account the characteristics of the teleconverter 300.

Figure 18:
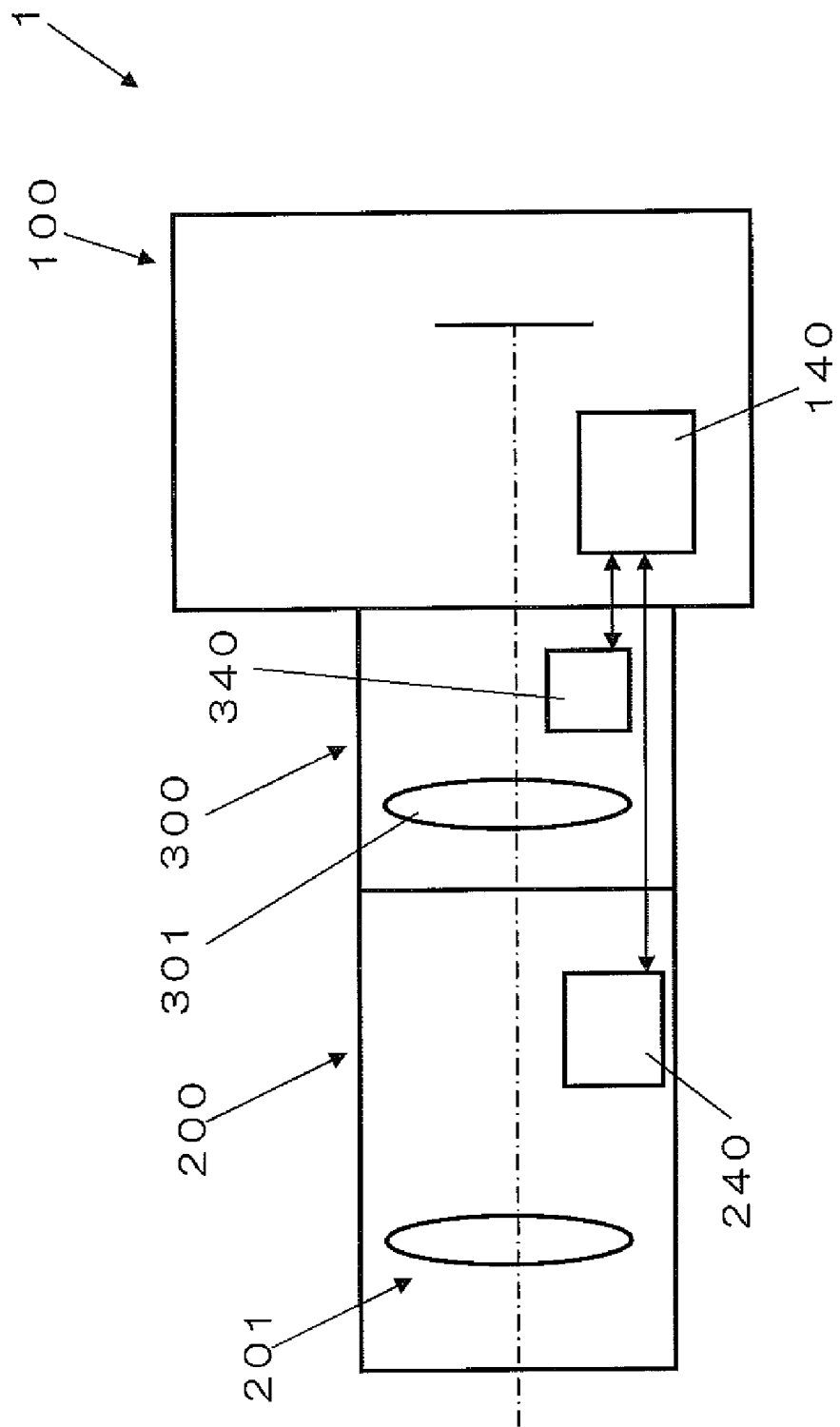
FIG. 18 is a simplified diagram of the configuration of a digital camera (another embodiment)

For example, as shown in FIG. 18, the teleconverter 300 has an optical system 301 and a controller 340. The focal distance of the entire digital camera 1 can be varied with the optical system 301. The controller 340 is connected to the camera controller 140 via a mount (not shown). A correction coefficient table (an example of the third correction information) indicating the characteristics of distortion of the optical system 301 is stored in the controller 340. This correction coefficient table has, for example, three correction coefficients TC3, TC5, and TC7 and a magnification B. The correction coefficient TC3 corresponds to the above-mentioned correction coefficient C3. The correction coefficient TC5 corresponds to the above-mentioned correction coefficient C5. The correction coefficient TC7 corresponds to the above-mentioned correction coefficient C7. The magnification B is the magnification of the optical system 301.

When a correction coefficient table E2 is used, new correction coefficients LTC3, LTC5, and LTC7 are calculated from the following Equations 17, 18, and 19.

$$LTC3 = \frac{C3}{B} + TC3 \tag{17}$$

$$LTC5 = \frac{C5}{B} + TC5 \tag{18}$$

$$LTC7 = \frac{C7}{B} + TC7 \tag{19}$$

This computation is performed by the camera controller 140 on the correction coefficients C3, C5, and C7 selected by the correction coefficient selector 146 prior to the above-mentioned interpolation operation, for example.

Also, whether or not the teleconverter 300 is mounted is determined by the camera body 100 on the basis of lens data held in the controller 340 of the teleconverter 300.

Thus, the appropriate distortion correction can be performed even when the teleconverter 300 is mounted.

Figure 19:
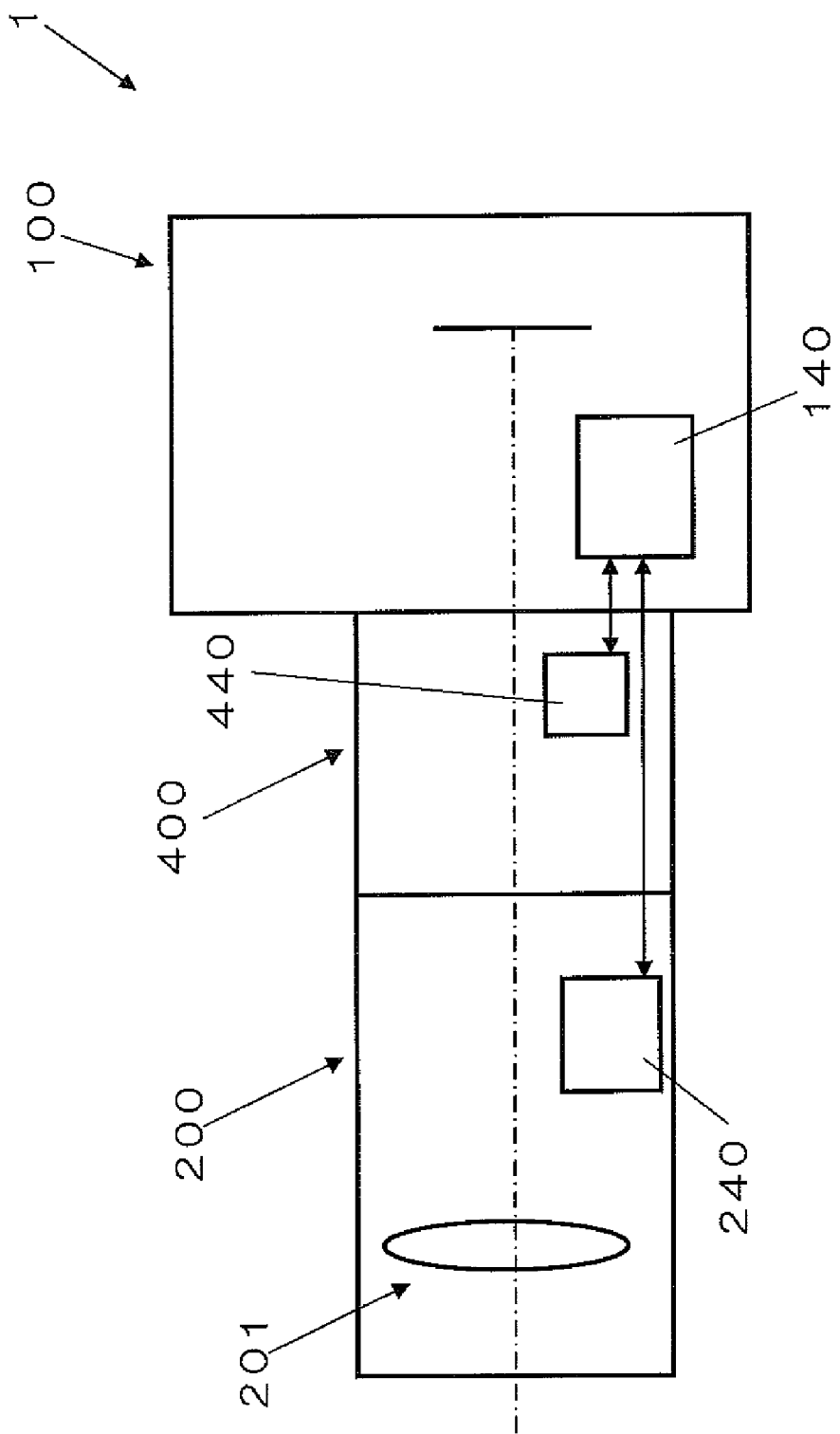
FIG. 19 is a simplified diagram of the configuration of a digital camera (another embodiment)

Also, an extension tube 400 may be mounted rather than the teleconverter 300 to the camera body 100. More specifically, as shown in FIG. 19, the extension tube 400 has a controller 440. This controller 440 is connected to the camera controller 140 via a mount (not shown). A correction coefficient table E3 indicating the characteristics of distortion of the extension tube 400 is stored in the controller 440. This correction coefficient table E3 has, for example, three correction coefficients EC3, EC5, and EC7 and a length EXT of the extension tube 400. The correction coefficient EC3 corresponds to the above-mentioned correction coefficient C3. The correction coefficient EC5 corresponds to the above-mentioned correction coefficient C5. The correction coefficient EC7 corresponds to the above-mentioned correction coefficient C7.

When the correction coefficient table E3 is used, new correction coefficients LEC3, LEC5, and LEC7 are calculated from the following Equations 20, 21, and 22.

$$LEC3 = \frac{C3}{(1 + EC3 \times EXT)^3} \tag{20}$$

$$LEC5 = \frac{C5}{(1 + EC5 \times EXT)^5} \tag{21}$$

-continued $$LEC7 = \frac{C7}{(1 + EC7 \times EXT)^7} \quad (22)$$

This computation is performed by the camera controller 140 on the correction coefficients C3, C5, and C7 selected by the correction coefficient selector 146 prior to the above-mentioned interpolation operation, for example.

Also, whether or not the extension tube 400 is mounted is determined by the camera body 100 on the basis of lens data held in the controller 440 of the extension tube 400.

Thus, the appropriate distortion correction can be performed even when the extension tube 400 is mounted.

(B) In the above embodiment, the correction ratio T is included in the correction coefficient table E, and the correction ratio T is always used to correct distortion. However, the configuration may be such that the user can selected whether or not to use the correction ratio T for computation.

Also, if there is no need to leave some distortion, the distortion correction may be performed in a state in which there is no correction ratio T.

Also, under conditions in which no pixel defects occur, the magnification correction value M does not have to be used to perform distortion correction.

(C) In the above embodiment, a single gain TMG' is calculated by interpolation operation from four gains TMG after the calculation of these four gains TMG and four sets of correction coefficients C3, C5, and C7 selected by the correction coefficient selector 146.

Figure 20:
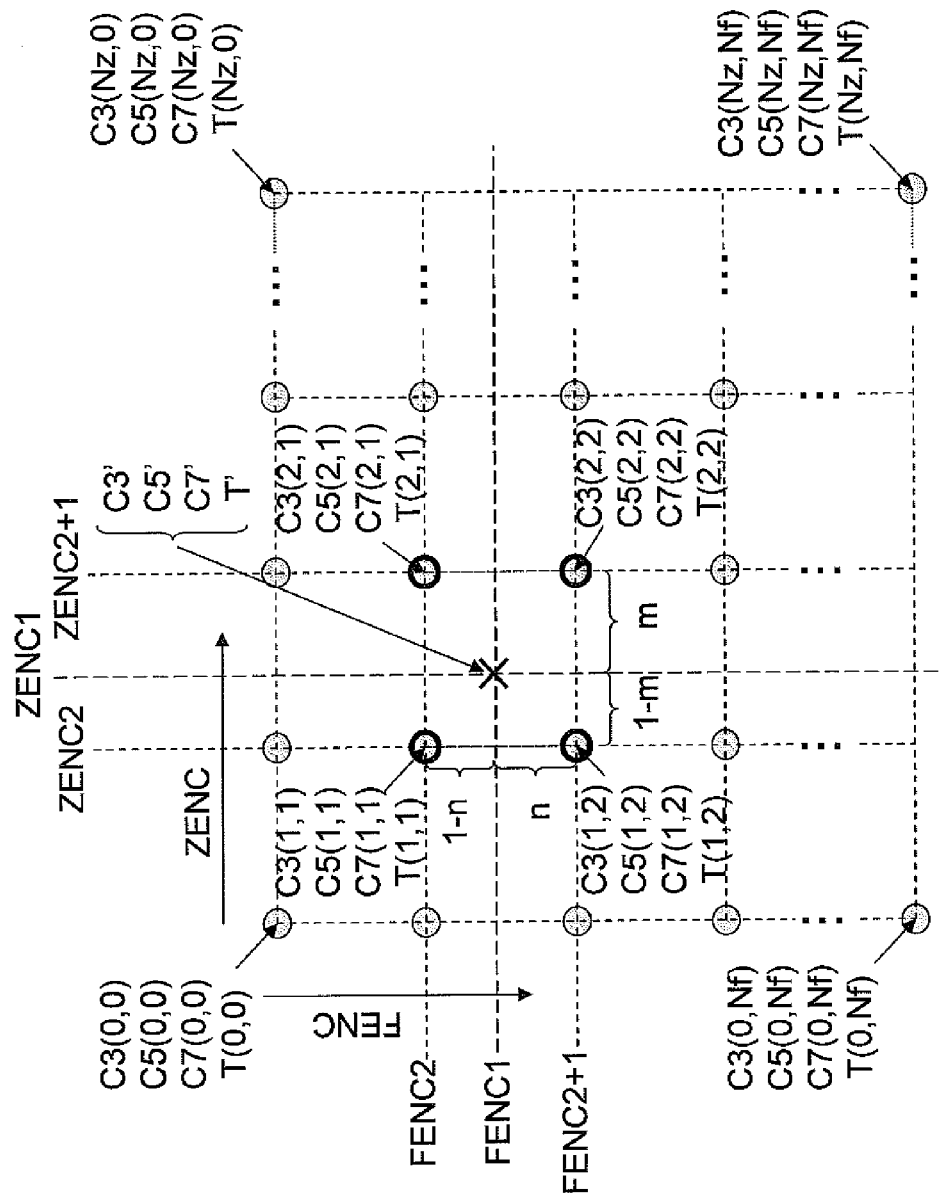
FIG. 20 is a diagram explaining an interpolation operation (another embodiment).

However, as shown in FIG. 20, for example, the interpolation operation may be performed on the four sets of correction coefficients C3, C5, and C7 and the four correction ratios T, and the gain TMG' calculated from the resulting set of correction coefficients C3', C5', and C7' and correction ratio T'.

(D) In the above-mentioned Equation 2, the degree of the actual image height Y is third, fifth, and seventh, but the formula used in correcting the distortion is not limited to Equation 2, and another formula may be used instead. If another formula is used, the type of correction coefficient and so forth may be different.

(E) In the above embodiment, the camera body 100 holds the various computational formulas, but they may instead be held by the interchangeable lens unit 200. This constitution is effective when it is preferable to use a different computational formula for each interchangeable lens unit, for example.

(F) The configuration of the digital camera 1 is not limited to that in the above embodiment. For example, the digital camera 1 may have a quick return mirror or a viewing optical system.

(G) In the above embodiment, interpolation operation is performed on the correction coefficient table E, but extrapolation processing may be used instead. Again when extrapolation processing is used, distortion can be properly corrected even when a different interchangeable lens is mounted.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An imaging device for acquiring image data for a subject, comprising:
    an interchangeable lens unit having an optical system provided to form an optical image of the subject, and a first holding part configured to hold first correction information used to electrically correct distortion produced by the optical system; and
    a camera body having an image acquisition part configured to convert the optical image into image data, a correction information acquisition part configured to acquire the first correction information held in the first holding part, an operation part configured to produce second correction information by performing an interpolation operation or an extrapolation operation on the first correction information, and a distortion corrector configured to correct distortion in the image data on the basis of the second correction information, wherein
    the first correction information includes a plurality of correction coefficients used to correct the distortion in the image data,
    the camera body has a correction information selector configured to select the correction coefficients from the first correction information as selected correction coefficient group, and
    the operation part is configured to produce the second correction information on the basis of the selected correction coefficient group.

2. The imaging device according to claim 1, wherein the distortion corrector is configured to correct distortion by using a magnifying power correction value for keeping the corrected image data at or above a specific size.

3. The imaging device according to claim 1, wherein the first holding part is configured to hold first identification information used to identify the interchangeable lens unit,
    the camera body has an identification information acquisition part capable of acquiring the first identification information held in the first holding part as a second identification information, a second holding part that can associate and hold the second identification information and the first correction information corresponding to the second identification information, and a comparator configured to compare the first identification information with the second identification information, and
    when the comparator determines that the first identification information held in the first holding part matches the second identification information held in the second holding part, the distortion corrector corrects the distortion by using the first correction information held in the second holding part and corresponding to the second identification information.

4. The imaging device according to claim 1, further comprising
    an accessory unit mounted between the interchangeable lens unit and the camera body, and having a third holding part configured to hold third correction information used to correct the distortion, wherein
    the correction information acquisition part is able to acquire the third correction information held in the third holding part, and
    the distortion corrector is configured to correct the distortion on the basis of the first correction information and the third correction information.

5. The imaging device according to claim 1, wherein
the optical system is capable of changing the focal distance, and has a focus lens arranged to adjust the focal state of the optical image, and
the first correction information includes a correction coefficient table, in which are arranged the plurality of correction coefficients used to correct the distortion on the basis of zoom information related to the focal distance of the optical system and focus information related to the focal state of the optical image.

6. The imaging device according to claim 5, wherein
the distortion corrector is configured to correct distortion by using a magnifying power correction value for keeping the corrected image data at or above a specific size.

7. The imaging device according to claim 5, wherein
the first holding part is configured to hold first identification information used to identify the interchangeable lens unit,
the camera body has an identification information acquisition part capable of acquiring the first identification information held in the first holding part as a second identification information, a second holding part that can associate and hold the second identification information and the first correction information corresponding to the second identification information, and a comparator configured to compare the first identification information with the second identification information, and
when the comparator determines that the first identification information held in the first holding part matches the second identification information held in the second holding part, the distortion corrector corrects the distortion by using the first correction information held in the second holding part and corresponding to the second identification information.

8. The imaging device according to claim 5, further comprising
an accessory unit mounted between the interchangeable lens unit and the camera body, and having a third holding part configured to hold third correction information used to correct the distortion, wherein
the correction information acquisition part is able to acquire the third correction information held in the third holding part, and
the distortion corrector is configured to correct the distortion on the basis of the first correction information and the third correction information.

9. The imaging device according to claim 5, wherein
the interchangeable lens unit has a first detector configured to acquire the zoom information as a detected zoom information, and a second detector configured to acquire the focus information as a detected focus information,
the camera body has a first information acquisition part configured to acquire the detected zoom information from the first detector, and a second information acquisition part configured to acquire the detected focus information from the first detector, and
the correction information selector configured to select the correction coefficients corresponding to the detected zoom information and the detected focus information from the second correction information.

10. The imaging device according to claim 9, wherein
the correction coefficient table includes a plurality of correction ratios arranged along with the plurality of correction coefficients on the basis of the zoom information and the focus information and used to adjust the proportion in which the correction coefficients act during correction of the distortion.

11. The imaging device according to claim 9, wherein
the distortion corrector is configured to correct distortion by using a magnifying power correction value for keeping the corrected image data at or above a specific size.

12. The imaging device according to claim 9, wherein
the first holding part is configured to hold first identification information used to identify the interchangeable lens unit,
the camera body has an identification information acquisition part capable of acquiring the first identification information held in the first holding part as a second identification information, a second holding part that can associate and hold the second identification information and the first correction information corresponding to the second identification information, and a comparator configured to compare the first identification information with the second identification information, and
when the comparator determines that the first identification information held in the first holding part matches the second identification information held in the second holding part, the distortion corrector corrects the distortion by using the first correction information held in the second holding part and corresponding to the second identification information.

13. The imaging device according to claim 9, further comprising
an accessory unit mounted between the interchangeable lens unit and the camera body, and having a third holding part configured to hold third correction information used to correct the distortion, wherein
the correction information acquisition part is able to acquire the third correction information held in the third holding part, and
the distortion corrector is configured to correct the distortion on the basis of the first correction information and the third correction information.

14. The imaging device according to claim 9, wherein
the distortion corrector is configured to correct distortion by using a magnifying power correction value for keeping the corrected image data at or above a specific size.

15. The imaging device according to claim 9, wherein
the first holding part is configured to hold first identification information used to identify the interchangeable lens unit,
the camera body has an identification information acquisition part capable of acquiring the first identification information held in the first holding part as a second identification information, a second holding part that can associate and hold the second identification information and the first correction information corresponding to the second identification information, and a comparator configured to compare the first identification information with the second identification information, and
when the comparator determines that the first identification information held in the first holding part matches the second identification information held in the second holding part, the distortion corrector corrects the distortion by using the first correction information held in the second holding part and corresponding to the second identification information.

16. An imaging device for acquiring image data for a subject, comprising:
- an interchangeable lens unit having an optical system provided to form an optical image of the subject, and a first holding part configured to hold first correction information used to electrically correct distortion produced by the optical system; and
- a camera body having an image acquisition part configured to convert the optical image into image data, a correction information acquisition part configured to acquire the first correction information held in the first holding part, an operation part configured to produce second correction information by performing an interpolation operation or an extrapolation operation on the first correction information, and a distortion corrector configured to correct distortion in the image data on the basis of the second correction information, wherein the distortion corrector is configured to correct distortion by using a magnifying power correction value for keeping the corrected image data at or above a specific size.

17. An imaging device for acquiring image data for a subject, comprising:
- an interchangeable lens unit having an optical system provided to form an optical image of the subject, and a first holding part configured to hold first correction information used to electrically correct distortion produced by the optical system; and
- a camera body having an image acquisition part configured to convert the optical image into image data, a correction information acquisition part configured to acquire the first correction information held in the first holding part, an operation part configured to produce second correction information by performing an interpolation operation or an extrapolation operation on the first correction information, and a distortion corrector configured to correct distortion in the image data on the basis of the second correction information, wherein the first holding part is configured to hold first identification information used to identify the interchangeable lens unit, the camera body has an identification information acquisition part capable of acquiring the first identification information held in the first holding part as a second identification information, a second holding part that can associate and hold the second identification information and the first correction information corresponding to the second identification information, and a comparator configured to compare the first identification information with the second identification information, and when the comparator determines that the first identification information held in the first holding part matches the second identification information held in the second holding part, the distortion corrector corrects the distortion by using the first correction information held in the second holding part and corresponding to the second identification information.

18. An imaging device for acquiring image data for a subject, comprising:
- an interchangeable lens unit having an optical system provided to form an optical image of the subject and a first holding part configured to hold first correction information used to electrically correct distortion produced by the optical system;
- a camera body having an image acquisition part configured to convert the optical image into image data, a correction information acquisition part configured to acquire the first correction information held in the first holding part, an operation part configured to produce second correction information by performing an interpolation operation or an extrapolation operation on the first correction information, and a distortion corrector configured to correct distortion in the image data on the basis of the second correction information; and
- an accessory unit mounted between the interchangeable lens unit and the camera body, and having a third holding part configured to hold third correction information used to correct the distortion, wherein the correction information acquisition part is able to acquire the third correction information held in the third holding part, and the distortion corrector is configured to correct the distortion on the basis of the first correction information and the third correction information.

19. A camera body used in an imaging device for acquiring image data of a subject along with an interchangeable lens unit, comprising:
- an image acquisition part configured to convert an optical image of the subject into image data;
- a correction information acquisition part configured to acquire from the interchangeable lens unit first correction information used to electrically correct distortion produced by the interchangeable lens unit;
- an operation part configured to produce second correction information by performing an interpolation operation or an extrapolation operation on the first correction information; and
- a distortion corrector configured to correct distortion in the image data on the basis of the second correction information, wherein the first correction information includes a plurality of correction coefficients used to correct the distortion in the image data, the camera body has a correction information selector configured to select the correction coefficients from the first correction information as selected correction coefficient group, and the operation part is configured to produce the second correction information on the basis of the selected correction coefficient group.

20. A camera body used in an imaging device for acquiring image data of a subject along with an interchangeable lens unit, comprising:
- an interface for receiving and transmitting data to and from the interchangeable lens unit;
- a controller coupled to the interface; and
- a memory coupled to the controller, the memory including instructions for configuring the controller to:
  - convert an optical image received among the data from the interface into image data;
  - acquire first correction information stored in a portion of the memory, the first correction information including a plurality of correction coefficients used to correct distortion in the image data;
  - select the correction coefficients from the first correction information as a selected correction coefficient group
  - produce second correction information by performing an interpolation operation or an extrapolation operation on the first correction information on the basis of the selected correction coefficient group; and
  - correct distortion in the image data on based on the second correction information.

* * * * *